US010678394B2

(12) United States Patent
Somlai-Fischer et al.

(10) Patent No.: US 10,678,394 B2
(45) Date of Patent: Jun. 9, 2020

(54) SYSTEM AND METHOD TO COMPOSITA ZUI MOTION PICTURE PRESENTATION AND PHYSICAL SCENE MOTION PICTURE PRESENTATION

(71) Applicant: Prezi, Inc., San Francisco, CA (US)

(72) Inventors: Adam Somlai-Fischer, Budapest (HU); Dániel Varga, Budapest (HU); Peter Sipos, Budapest (HU); Balint Gabor, Budapest (HU); Elod Kuthy, Budapest (HU)

(73) Assignee: Prezi, Inc., San Francisco, CA (US)

( * ) Notice: Subject to any disclaimer, the term of this patent is extended or adjusted under 35 U.S.C. 154(b) by 73 days.

(21) Appl. No.: 15/961,197

(22) Filed: Apr. 24, 2018

(65) Prior Publication Data

US 2018/0307380 A1 Oct. 25, 2018

Related U.S. Application Data

(60) Provisional application No. 62/488,919, filed on Apr. 24, 2017.

(51) Int. Cl.
*G06F 3/0481* (2013.01)
*G06F 3/0485* (2013.01)
(Continued)

(52) U.S. Cl.
CPC .......... *G06F 3/0481* (2013.01); *G06F 3/0485* (2013.01); *G06F 3/04845* (2013.01); *G06F 16/739* (2019.01); *G06T 3/40* (2013.01); *G09G 5/00* (2013.01); *G09G 5/006* (2013.01); *G09G 5/14* (2013.01); *H04N 5/23216* (2013.01);
(Continued)

(58) Field of Classification Search
CPC .. G06F 3/0481; G06F 16/739; G06F 3/04845; G06F 3/0485; G06F 2203/04806; G09G 5/14; H04N 5/23216; H04N 5/23293; H04N 5/23296
See application file for complete search history.

(56) References Cited

U.S. PATENT DOCUMENTS 10,545,626 B2    1/2020  Somlai-Fischer et al.
2004/0027313 A1* 2/2004  Pate ....................... G09G 3/001
                                                              345/30

(Continued)

OTHER PUBLICATIONS

"U.S. Appl. No. 15/961,207, Non Final Office Action dated Jun. 13, 2019", 58 pgs.

(Continued)

*Primary Examiner* — Thai Q Tran
*Assistant Examiner* — Jose M Mesa
(74) *Attorney, Agent, or Firm* — Schwegman Lundberg & Woessner, P.A

(57) ABSTRACT

A method of compositing a zooming user interface (ZUI) scene and a physical scene on a screen display is provided including: displaying on a display screen, ZUI motion picture images that show panning and zooming transitions within a ZUI presentation between a sequence of pauses at a sequence of target display elements within the ZUI presentation; displaying on the display screen physical scene motion picture images; prioritizing display of ZUI display elements at a location within an offset region; and prioritizing physical scene images at a location within a priority region.

34 Claims, 19 Drawing Sheets

(51) Int. Cl.
    *G06T 3/40*     (2006.01)
    *G09G 5/00*     (2006.01)
    *G09G 5/14*     (2006.01)
    *H04N 5/232*     (2006.01)
    *G06F 16/738*     (2019.01)
    *G06F 3/0484*     (2013.01)

(52) U.S. Cl.
    CPC ..... *H04N 5/23293* (2013.01); *H04N 5/23296* (2013.01); *G06F 2203/04806* (2013.01); *G09G 2340/045* (2013.01); *G09G 2340/14* (2013.01)

(56) References Cited

U.S. PATENT DOCUMENTS

| | | |
|---|---|---|
| 2008/0249376 A1 | 10/2008 | Zaleski |
| 2010/0310232 A1* | 12/2010 | Iwase ............. G11B 27/34 386/241 |
| 2012/0081611 A1 | 4/2012 | Tan et al. |
| 2014/0372894 A1 | 12/2014 | Pandy et al. |
| 2016/0027201 A1 | 1/2016 | Saito |
| 2016/0110901 A1* | 4/2016 | Connolly ............. G06T 11/60 345/661 |
| 2018/0307754 A1 | 10/2018 | Somlai-fischer et al. |

OTHER PUBLICATIONS

"U.S. Appl. No. 15/961,207, Notice of Allowance dated Sep. 18, 2019", 5 pgs.

"U.S. Appl. No. 15/961,207, Response filed Aug. 29, 2019 to Non Final Office Action dated Jun. 13, 2019", 21 pgs.

\* cited by examiner

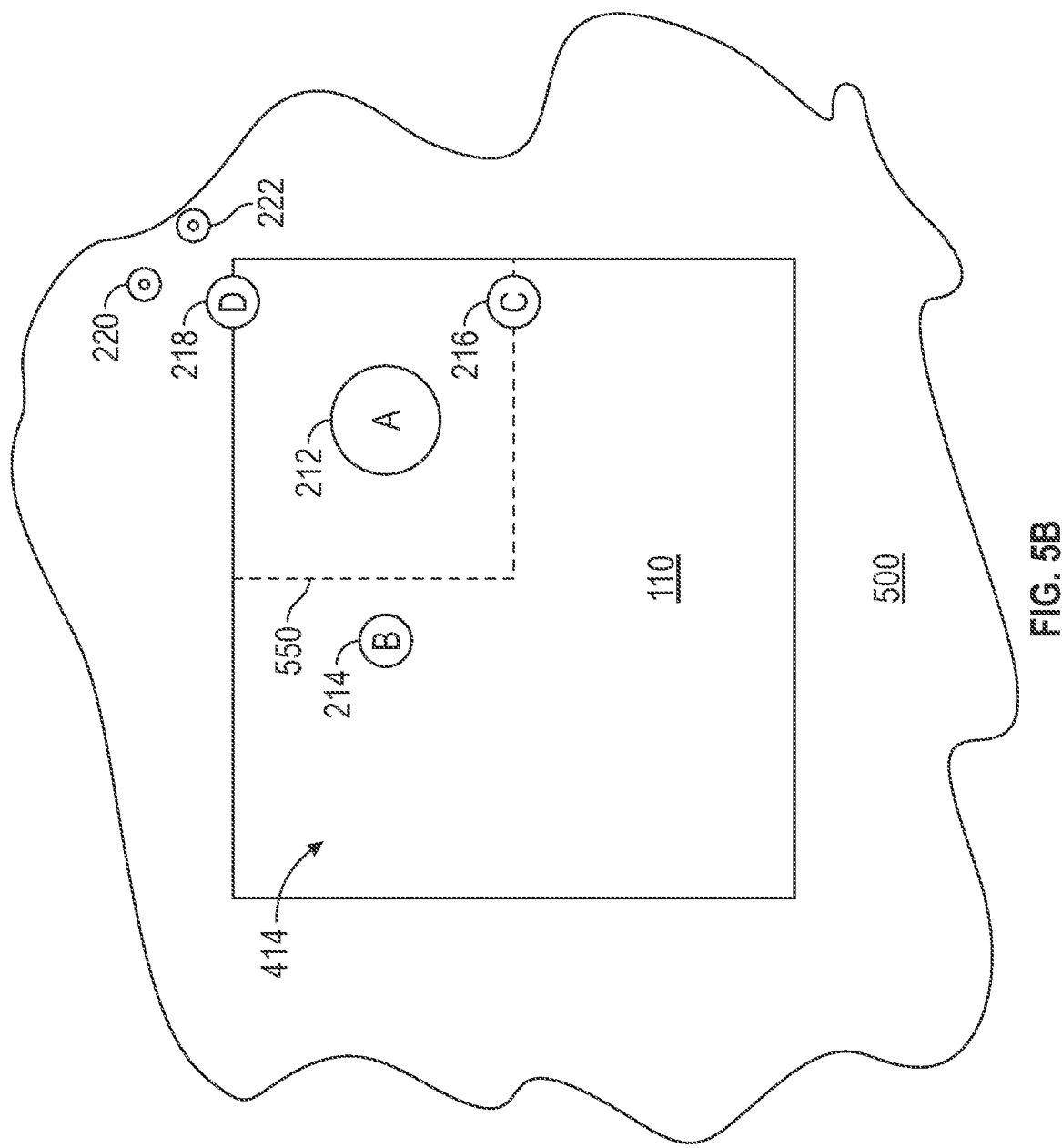

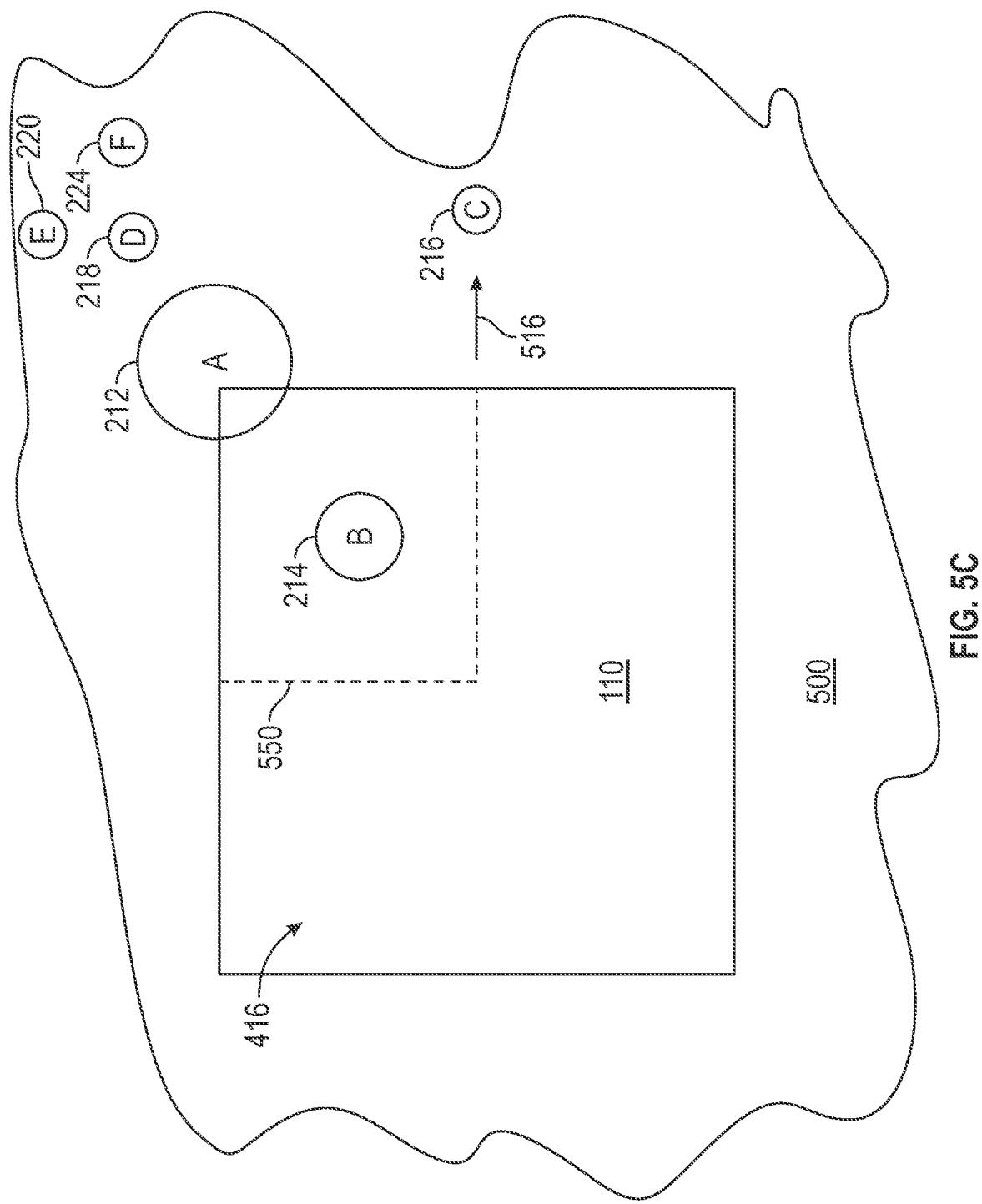

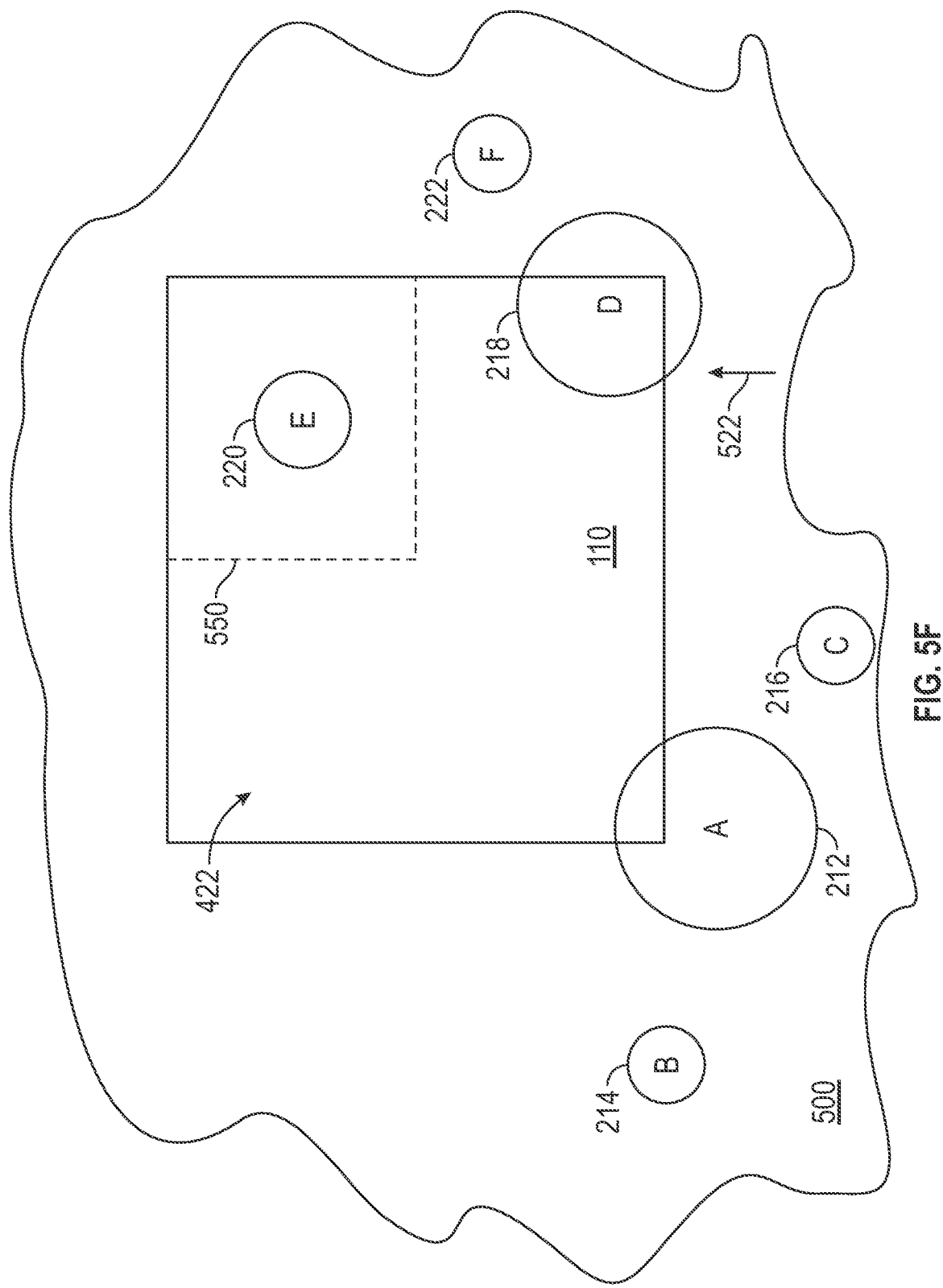

SYSTEM AND METHOD TO COMPOSITA ZUI MOTION PICTURE PRESENTATION AND PHYSICAL SCENE MOTION PICTURE PRESENTATION

RELATED APPLICATION

The present Nonprovisional U.S. Patent Application claims the benefit of the previous U.S. Provisional Patent Applications entitled "System and Method to Composite a ZUI Motion Picture Presentation and Physical Scene Motion Picture Presentation" filed with the U.S. Patent Office on Apr. 24, 2017 and having Ser. No. 62/488,919, which is expressly incorporated herein in its entirety by this reference.

BACKGROUND

A zooming user interface (ZUI) is a type of graphical user interface (GUI) in which the scale of a viewed area is changed in order to view more detail or less, and to browse through and among different visual display elements such as images, shapes, documents, or videos. Display elements may be added to a graphical workspace referred to as a 'canvas' to create a zoomable presentation in which details and subtopics can be presented through zooming in and out to reveal more or to reveal less detail. Typically, the canvas is larger than a viewing window generated on an electronic device display screen, and a user can scroll a viewing window to view different display elements disposed on different regions of the canvas. The ZUI differs from a normal canvas in that the user may zoom in or out from a display element. Display elements can be inserted anywhere among the presentation content. Users can pan across the canvas in two dimensions (in 2D) and zoom into objects of interest. Display elements present inside a zoomed region can in turn be zoomed themselves to reveal additional detail, allowing for recursive nesting and an arbitrary level of zoom. For example, as a user zooms into a text object, the text may be represented initially as a small dot, then as a thumbnail image, next as a complete page and finally as a magnified view of a portion of the page focused on a key passage from the text. Thus, ZUIs use zooming as the primary metaphor for browsing through multivariate or hyperlinked information, for example.

SUMMARY

In one aspect, a method is provided for compositing a zooming user interface (ZUI) scene and a physical scene on a screen display. ZUI motion picture images are displayed on a display screen together with motion pictures of a physical scene. The ZUI motion picture images show panning and zooming transitions within a ZUI presentation between a sequence of pauses at a sequence of target display elements within the ZUI presentation. The sequence pauses at a sequence of target display elements are shown at an offset region of the display screen, offset from a priority region of the display screen. Display of a portion of the ZUI presentation is prioritized over display of a portion of the physical scene motion picture at a location, within the offset region. Display of a portion of the physical scene motion picture is prioritized over display of a portion of the ZUI presentation at a location, within the priority region.

In another aspect, an electronic presentation system includes a computer system that includes at least one processor, a display screen, and a non-transitory computer readable medium operably coupled to the at least one processor, the non-transitory computer readable medium comprising a plurality of instructions stored in association therewith that are accessible to, and executable by, the at least one processor. The plurality of instructions include instructions that, when executed, configure the at least one processor to cause the display screen to display ZUI motion picture images that show panning and zooming transitions within a ZUI presentation between a sequence of pauses at a sequence of target display elements within the ZUI presentation. The sequence of pauses at the sequence of target display elements are displayed at an offset region of the display screen, offset from a priority region of the display screen. The plurality of instructions includes instructions that, when executed, configure the at least one processor to cause the display screen to display physical scene motion picture images. The plurality of instructions includes instructions that, when executed, configure the at least one processor to prioritize at a location within the offset region, display of a portion of the ZUI presentation over display of a portion of the physical scene. The plurality of instructions includes instructions that, when executed, configure the at least one processor to prioritize at a location within the priority region, display of a portion of the physical scene motion picture over display of a portion of the ZUI presentation.

BRIEF DESCRIPTION OF THE DRAWINGS

FIGS. 5A-5H are illustrative drawings indicating ZUI display elements on the canvas both inside and outside of a viewing window during the pauses of FIG. 4.

DESCRIPTION OF EMBODIMENTS

Hardware Configuration

Figure 1:
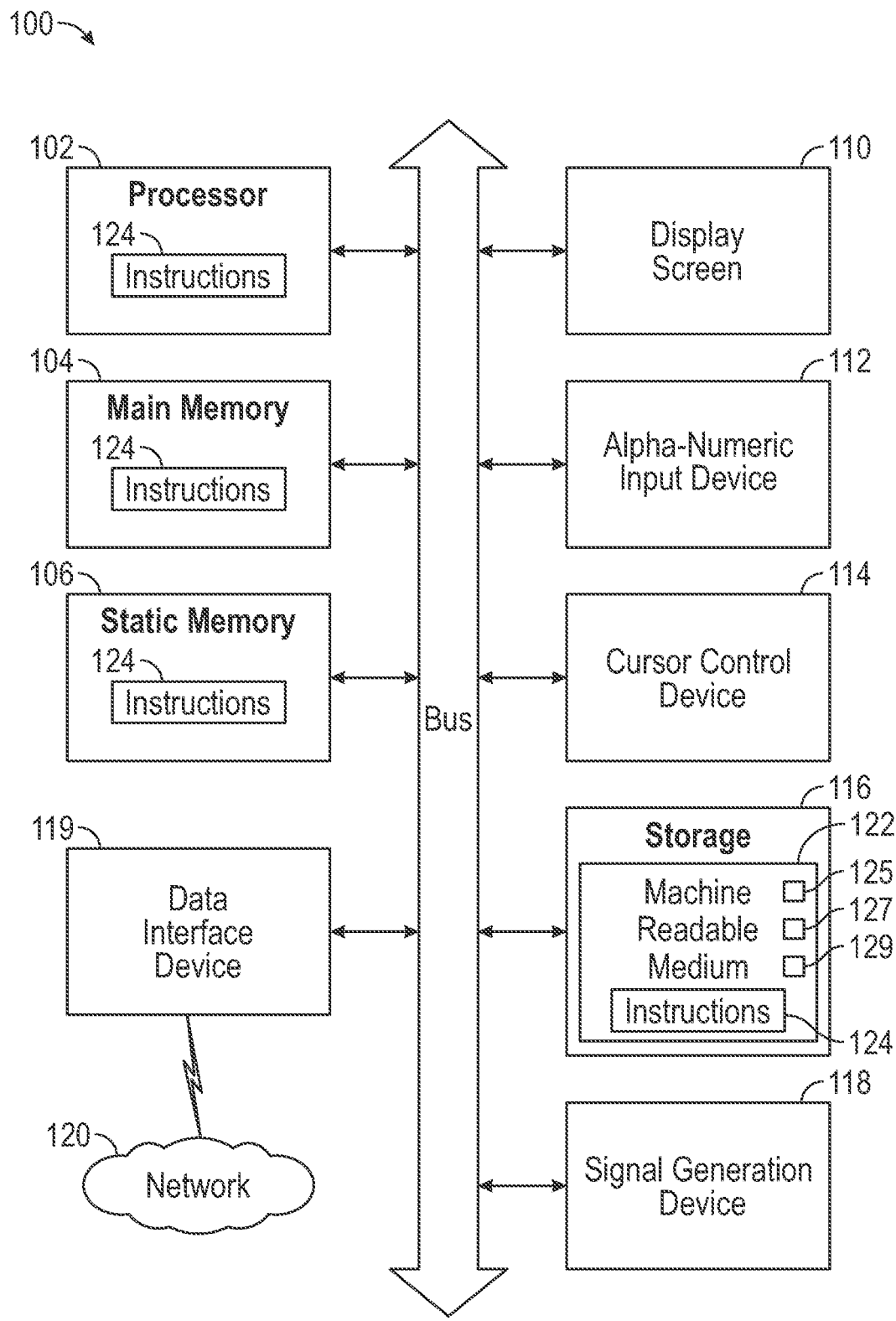
FIG. 1 is an illustrative diagrammatic representation of a computer system.

FIG. 1 shows an illustrative diagrammatic representation of a machine in the example form of a computer system 100 within which a set of instructions is included, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet, a set-top box (STB), a Personal Digital Assistant (PDA), a smart phone, a tablet, a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 100 includes a processor 102 (e.g., a central processing unit (CPU), a graphics processing unit (GPU), or both), a main memory 104 and a static memory 106, which communicate with each other via a bus 108. The computer system 100 may further include a display screen 110 (e.g., liquid crystal display (LCD), organic light emitting diode (OLED), touch screen, or a cathode ray tube (CRT)). The computer system 100 also includes one or more user input devices to receive user input commands. The user interface input devices of the illustrative system include an alphanumeric input device 112 (e.g., a physical or virtual keyboard), a cursor control device 114 (e.g., a mouse, a touch screen, a touchpad, a trackball, a trackpad), a non-transitory storage device 116, a signal generation device 118 (e.g., a speaker) one or more data interfaces 119 including an interface to a network interface device 120. The data interfaces 119 may be wired or wireless to send and receive information such as motion picture camera image information or network information, for example.

The storage device 116 includes a machine-readable medium 122 on which is stored one or more sets of instructions 124 (e.g., software) data structures 125 (e.g., an index structure) embodying any one or more of the methodologies or functions described herein. The machine-readable medium 122 also may store ZUI presentation motion picture frames 127 and physical scene motion picture frames 129. The storage device may include one or more of a disk drive, solid-state memories, optical and magnetic media, for example. The instructions 124 may also reside, completely or at least partially, within the main memory 104 and/or within the processor 102 during execution thereof by the computer system 100, the main memory 104 and the processor 102 also constituting machine-readable media. The instructions 124, data structures 125 and motion picture pixel frames 127, 129 may further be transmitted or received over the network 120 via the network interface device 119.

ZUI Presentation Example

Figure 2:
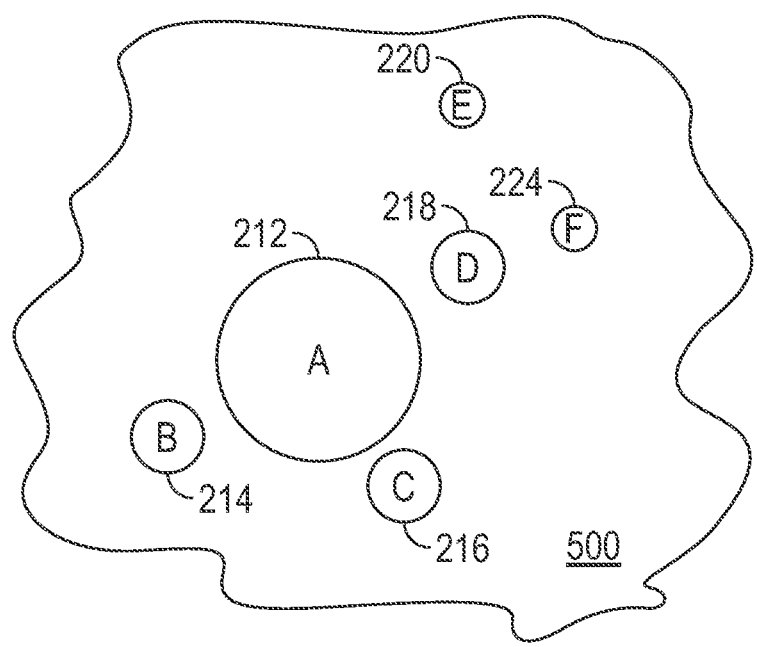
FIG. 2 is an illustrative drawing representing example display elements of an example ZUI presentation disposed on a canvas displayed on a computer display screen.

FIG. 2 is an illustrative drawing representing example display elements 212, 214, 216, 218, 220, 222 of an example ZUI presentation disposed on a canvas 500 that may be displayed on the display screen 110. The instructions 124 stored in the storage device 116 configure the central processing unit 102 to use ZUI motion picture frames 127 stored in the storage device 116 to display on the display screen 110, ZUI presentation motion picture images that include the display elements. The display elements may include text, images, shapes, boundary, documents, videos, or audio files, presented within them, for example. A boundary display element may act as a visual container that bounds another display element such as an image or text, for example. First boundary display element 212 encompasses text display element A. Second boundary display element 214 encompasses text display element B. Third boundary display element 216 encompasses text display element C. Fourth boundary display element 218 encompasses text display element D. Fifth boundary display element 220 encompasses text display element E. Sixth boundary display element 222 encompasses text display element F.

Figure 3:
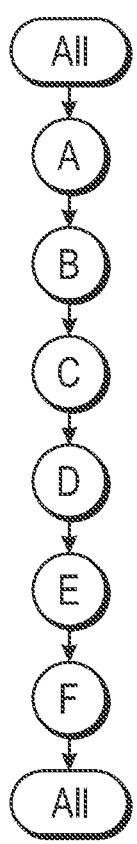
FIG. 3 is illustrative flow diagram indicating a sequence of transitions between display elements in the example ZUI presentation of FIG. 2.

FIG. 3 is illustrative flow diagram indicating a sequence of transitions between display elements in the example ZUI presentation of FIG. 2. The computer system 102 includes ZUI instructions within instructions 124 to control display of a ZUI presentation on the display screen 110 in response to ZUI commands that may be provided by a user. A ZUI presentation involves displaying transitions between multiple display elements disposed on a canvas 500 by panning across the canvas and zooming-in to and zooming-out from the canvas to adjust the portion of the canvas visible through a viewing window. The sequence of transitions progresses in order from display all of the display elements to the first display element 212 with text A, to the second display element 214 with text B, to the third display element 216 with text C, to the fourth display element 218 with text D, to the fifth display element 224 with text E, to the sixth display element 226 with text F, and back to display of all of the display elements.

Different display elements may have different sizes. In a ZUI presentation, size may represent hierarchy. Specifically, the size of a display element may represent its hierarchical position in a ZUI presentation. During a ZUI presentation, multiple display elements having different sizes may be displayed simultaneously in whole or in part within a viewing window, and differences in their sizes indicates differences in their positions in the ZUI presentation hierarchy. Zooming determines the proportion of the viewing window occupied by a display element, and therefore, its apparent size and prominence from the perspective of a user. During a pause, a display element encompassed within the viewing window and zoomed to a level to be clearly visible to a user becomes the temporarily center of attention, even though the viewing window also may encompass other display elements displayed too small to be clearly visible or displayed so large as to be only partially encompassed by the viewing window.

Figure 4:
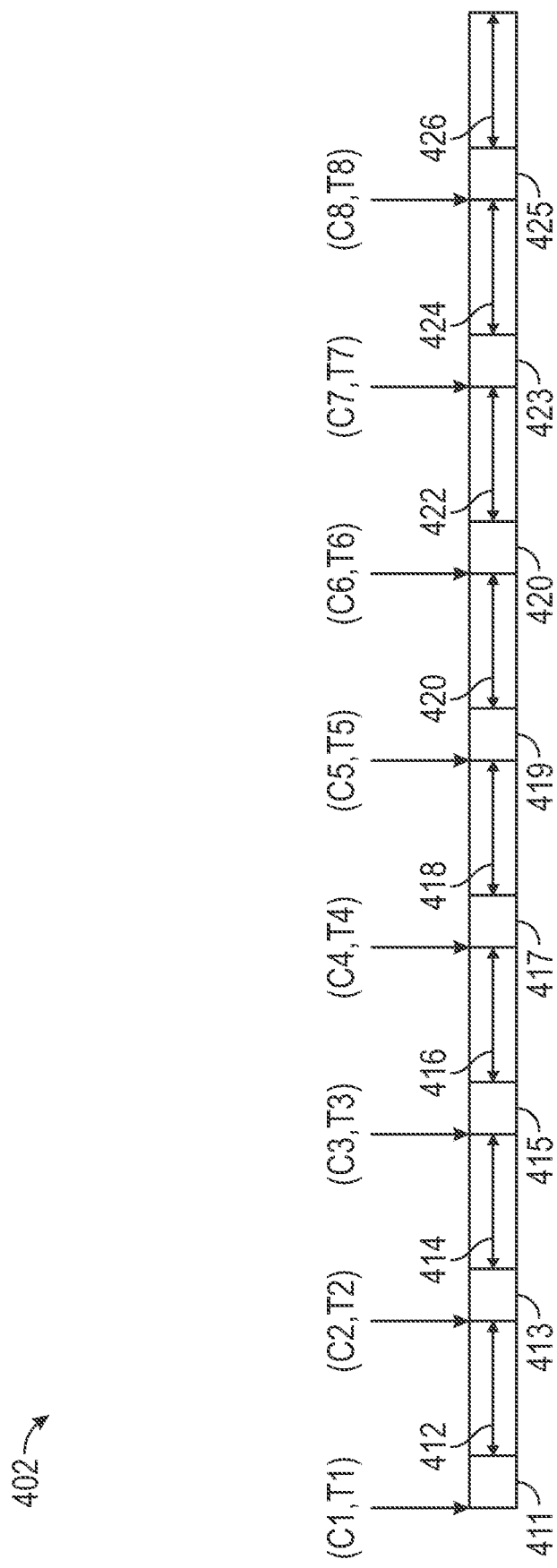
FIG. 4 is an illustrative drawing representing a sequence of example ZUI presentation motion picture image segments.

FIG. 4 is an illustrative drawing representing a sequence of example ZUI presentation motion picture image segments 402. A ZUI presentation includes transitions between pauses in the continuous display of motion picture images that during which panning across and zooming in and out from the canvas 500 on which ZUI display elements are disposed halts temporarily so that the canvas is temporarily stationary as is a region visible within the viewing window. More particularly, a ZUI presentation includes a sequence of motion picture transitions from one display element to the next. The ZUI presentation pauses at the end of each transition to display a display element that is the target or destination display element of the preceding motion picture transition that leads up to it. The transitions and the sequence of target display elements are displayed through a ZUI viewing window, which is produced on an electronic display screen. The displayed transitions may include planar, two dimensional, (x, y) direction motion of a canvas 500 on which the slides are displayed relative to the viewing window. The displayed motion picture transitions also may include zooming, vertical (z) direction motion of the canvas on which the slides are displayed to zoom in (move closer) to the canvas and zoom out (move way) from the canvas relative to the viewing window. The displayed transitions may include a combination of both planar direction motion and zooming direction motion to create a three-dimensional motion effect.

Referring to the example sequence of ZUI motion picture image transitions and pauses of FIG. 4, at time T1, a first user input command C1 is received initiating first ZUI transition motion picture frames 411, which precedes motion picture frames representing a first paused ZUI motion picture image 412. The frames of the first ZUI transition show panning and/or zooming of the ZUI canvas 500 to bring the first display element 212 into view. The first paused ZUI motion picture image 412 is displayed throughout a time interval between time T1 and T2. At time T2, a second user input command C2 is received initiating second ZUI transition motion picture images 413, which precedes motion picture frames representing a second paused ZUI motion picture image 414. The frames of the second ZUI transition show panning and/or zooming of the ZUI canvas 500 to bring the second display element 214 into view. The second paused ZUI motion picture image 414 is displayed throughout a time interval between time T2 and T3. At time T3, a third user input command C3 is received initiating third ZUI transition motion picture images 415, which precedes motion picture frames representing a third paused ZUI motion picture image 416. The frames of the second ZUI transition show panning and/or zooming of the ZUI canvas 500 to bring the third display element 216 into view. The third paused ZUI motion picture image 416 is displayed throughout a time interval between time T3 and T4. At time T4, a fourth user input command C4 is received initiating fourth ZUI transition motion picture images 417, which precedes motion picture frames representing a fourth paused ZUI motion picture image 418. The frames of the fourth ZUI transition show panning and/or zooming of the ZUI canvas 500 to bring the fourth display element 218 into view. The fourth paused ZUI motion picture image 418 is displayed throughout a time interval between time T4 and T5. At time T5, a fifth user input command C5 is received initiating fifth ZUI transition motion picture images 419, which precedes motion picture frames representing a fifth paused ZUI motion picture image 420. The frames of the fifth ZUI transition show panning and/or zooming of the ZUI canvas 500 to bring the fifth display element 220 into view. The fifth paused ZUI motion picture image 420 is displayed throughout a time interval between time T5 and T6. At time T6, a sixth user input command C6 is received initiating sixth ZUI transition motion picture images 421, which precedes motion picture frames representing a sixth paused ZUI motion picture image 422. The frames of the sixth ZUI transition show panning and/or zooming of the ZUI canvas 500 to bring the sixth display element 212 into view. The sixth paused ZUI motion picture image 422 is displayed throughout a time interval between time T6 and T7. At time T7, a seventh user input command C7 is received initiating seventh ZUI transition motion picture images 423, which precedes motion picture frames representing a seventh paused ZUI motion picture image 424. The frames of the seventh ZUI transition show panning and/or zooming of the ZUI canvas 500 to bring the seventh display element 212 into view. The seventh paused ZUI motion picture image 424 is displayed throughout a time interval between time T7 and T8. At time T8, an eighth user input command C8 is received initiating eighth ZUI transition motion picture images 425, which precedes an eighth ZUI paused motion picture image 426 at the end of the ZUI presentation sequence.

FIGS. 5A-5H are illustrative drawings indicating ZUI display elements on the canvas both inside and outside of a viewing window during the pauses of FIG. 4. The viewing window is coextensive with an electronic device display screen on which the motion picture images are displayed. The viewing window includes an offset region where successive target display elements are displayed during successive pauses in panning and zooming during display of a ZUI presentation. The display of the ZUI presentation is targeted such that during a transition to a pause, the canvas 500 is panned and zoomed to maneuver a next target display element to a position within the offset region at a legibly visible zoom level. As explained more fully below, the offset region is selected to be offset from a prioritized scene region of another motion picture sequence that is composited on the display screen with the ZUI presentation. A transition between display elements in a ZUI presentation involves a motion picture display showing movement of a canvas, either planar or zooming or a combination of both, to change the portion of the canvas displayed within the viewing window. It will be appreciated that zooming movement, while changing the distance of the canvas from the viewing window, also changes the range of planar locations displayed within the viewing window. The more distant the canvas is from the viewing window, the larger the planar range of planar locations on the canvas that are displayed within the viewing window. The closer the canvas is to the viewing window, the narrower the range of planar locations on the canvas that are displayed within the viewing window. A target display element is a display element to which the ZUI presentation transitions, through panning and zooming of the canvas, to temporarily, during a pause, become a center of attention of a user watching the viewing window.

Figure 5A:
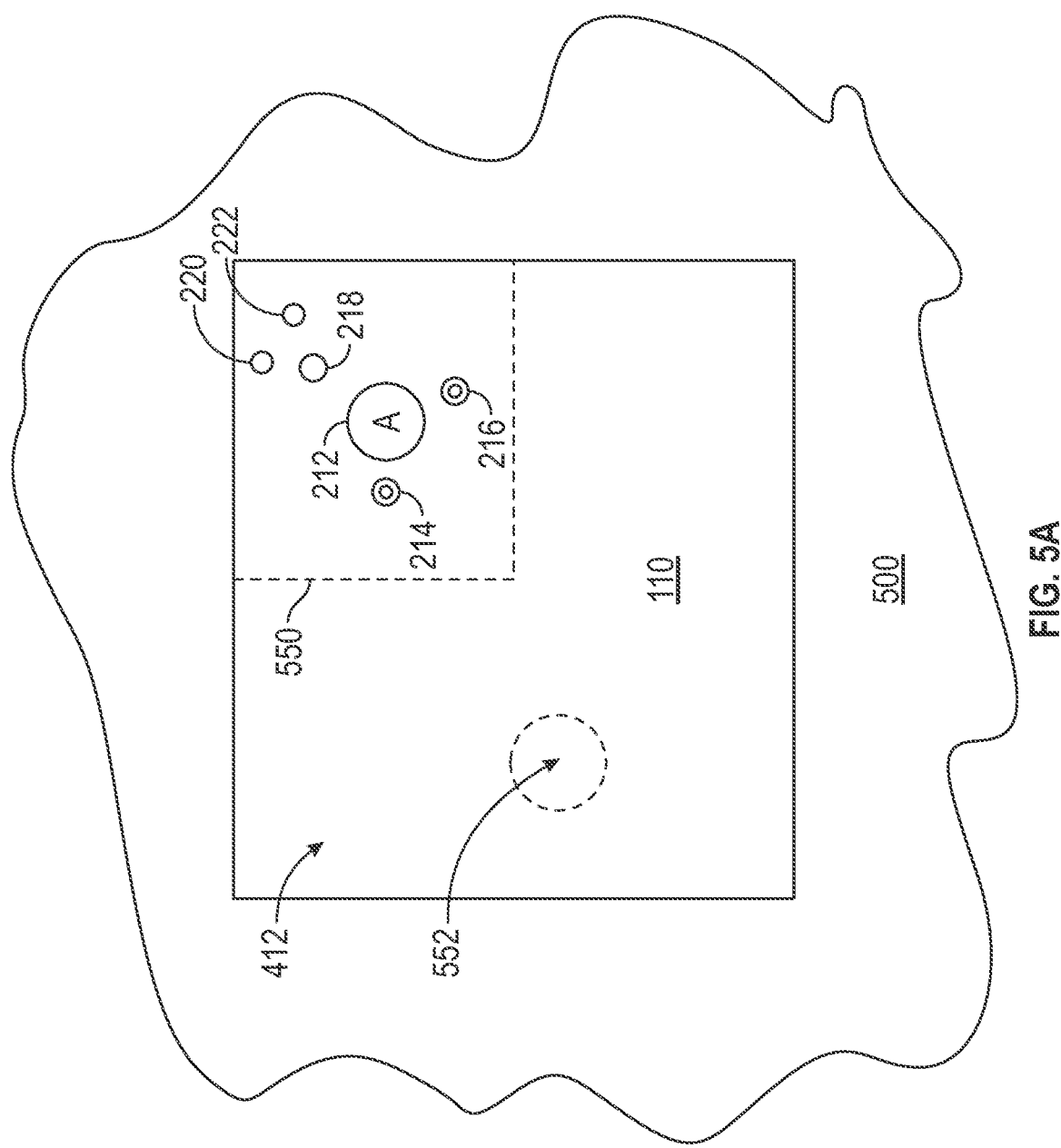

FIG. 5A is an illustrative drawing showing canvas locations of the display elements of the ZUI presentation on the canvas 500 relative to the display screen 110 during display of the paused target ZUI motion picture image 412. The display screen is co-extensive with a ZUI viewing window. The field of view of the canvas encompassed by the display screen/viewing window (also referred to herein as 'display screen') determines which display elements are displayed on the viewing window. As the canvas 500 moves relative to the display screen 110 (or vice versa), the display elements displayed on the display screen 110 change. It will be understood that although the display elements are disposed on the canvas 500, the canvas itself is not displayed on the display screen 110. The display screen 110 includes an offset region within dashed lines 550 that is offset from an example prioritized scene region 552, explained more fully which located on a left side of the screen 110c which is explained below. The entire collection of display elements within the ZUI presentation are displayed on the display screen 110 at or about a center location 554 of the offset region 550. It is noted that only the text A display element of the first boundary display element 212 is legibly visible. The text display elements of the other boundary display elements are too small to be legibly visible.

FIG. 5B is an illustrative drawing showing canvas locations of the display elements of the ZUI presentation on the canvas 500 relative to the display screen 110 during display of the paused target ZUI motion picture image 414. A ZUI motion picture transition from previous target ZUI image 412 to new target ZUI image 414 involves ZUI images showing zooming in closer. The canvas 500 has moved relative to the screen display/viewing window 110 such that the first (largest size) boundary display element 212 is located on the display screen 110 at about the center location 554 of the offset region 550. The second and third boundary display elements 214, 216 are located in whole on the display screen 110. The third boundary display element 218 is displayed in part on the display screen 110. Portions of the third and fourth boundary display elements 216, 218 are displayed on the display screen 110 within the offset region 550. The field of view within the display screen/viewing window 110 is zoomed in to a distance closer than the zoom level in FIG. 5A, such that the display element content, text A, of the first boundary display element 212 is easily legible to a viewer. The text A within the first boundary display element 212 is sized to be more easily legible than the smaller size texts C and D of the third and fourth boundary elements 216, 218. The fifth and sixth boundary display elements 220, 222 are disposed on a region of the canvas that is not within the field of view of the display screen 110 (which is coextensive with the viewing window)

FIG. 5C is an illustrative drawing showing canvas locations of the display elements of the ZUI presentation on the canvas 500 relative to the display screen 110 during display of the paused target ZUI motion picture image 416. A ZUI motion picture transition from previous target ZUI image 414 to new target ZUI image 416 involves ZUI images showing zooming in closer and panning in direction of arrow 516. The canvas 500 has moved relative to the screen display/viewing window 110 such that the second boundary display element 214 is located at about the center location 554 of the offset region 550. A portion of the first boundary display element 212 also is displayed on the screen 110 within the offset region 550. Since the second boundary display element 214 is smaller in size than the first boundary display element 212, the field of view within the display screen/viewing window 110 is zoomed in to a distance closer than the zoom level in FIG. 5B, such that the display element content, text B, of the second boundary display element 214 is easily legible to a viewer. None of the other boundary display elements on the canvas 500 is within the field of view of the display screen 110, and therefore none of them is visible on the display screen 110.

Figure 5D:
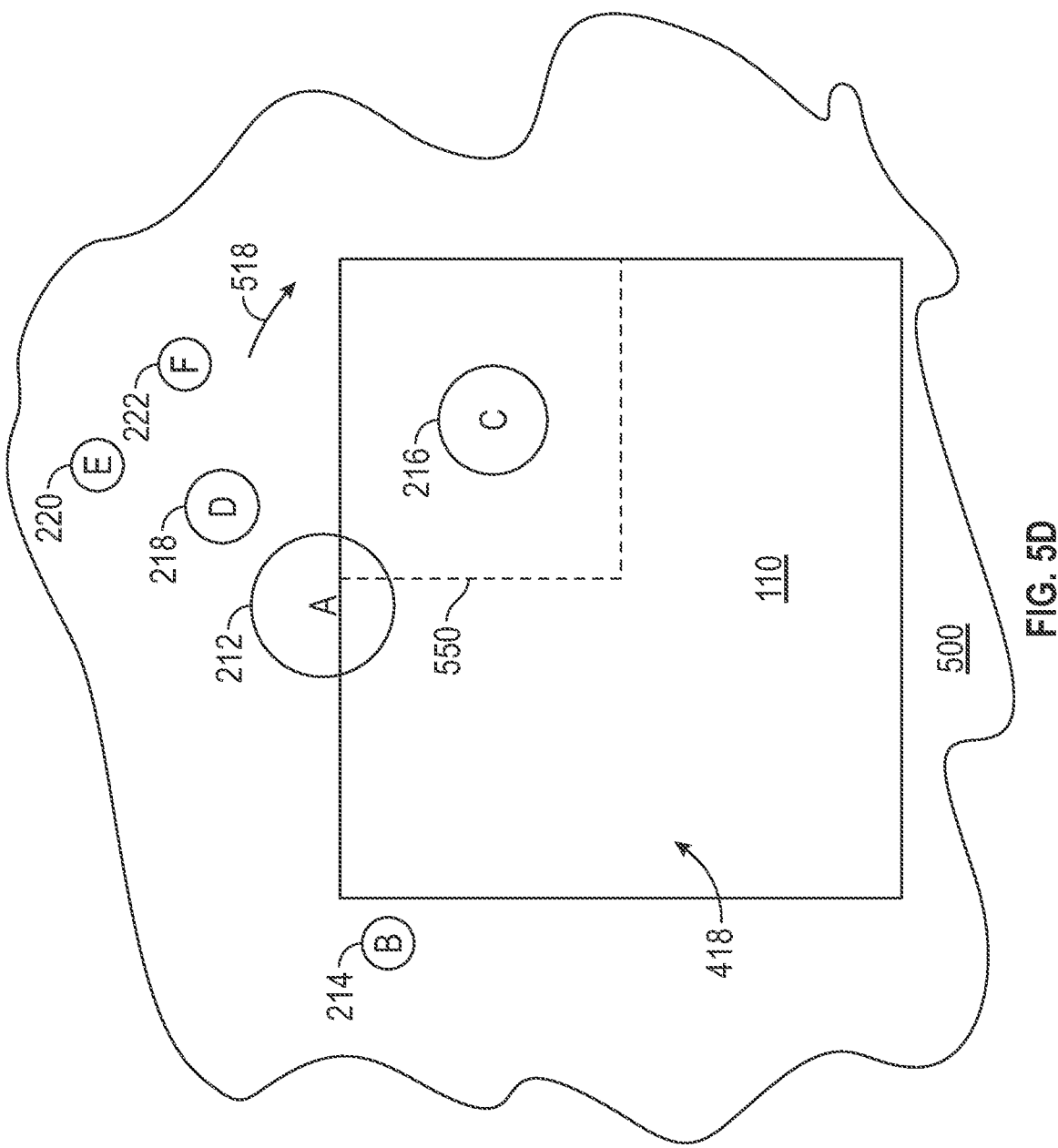

FIG. 5D is an illustrative drawing showing canvas locations of the display elements of the ZUI presentation on the canvas 500 relative to the display screen 110 during display of the paused target ZUI motion picture image 418. A ZUI motion picture transition from previous target ZUI image 416 to new target ZUI image 418 involves images showing panning in direction of arrow 518. The canvas 500 has moved relative to the screen display/viewing window 110 such that the third boundary display element 216 is located at about the center location 554 of the offset region 550. A portion of the first boundary display element 212 also is displayed on the screen 110, partially within and partially outside the offset region 550. The field of view within the display screen/viewing window 110 is zoomed in to the same distance as the zoom level in FIG. 5C, since the second and third boundary display elements 214, 216 are the same size on the canvas 500, such that the display element content, text C, of the third boundary display element 216 is easily legible to a viewer. None of the other boundary display elements on the canvas 500 is within the field of view of the display screen 110, and therefore none of them is visible on the display screen 110.

Figure 5E:
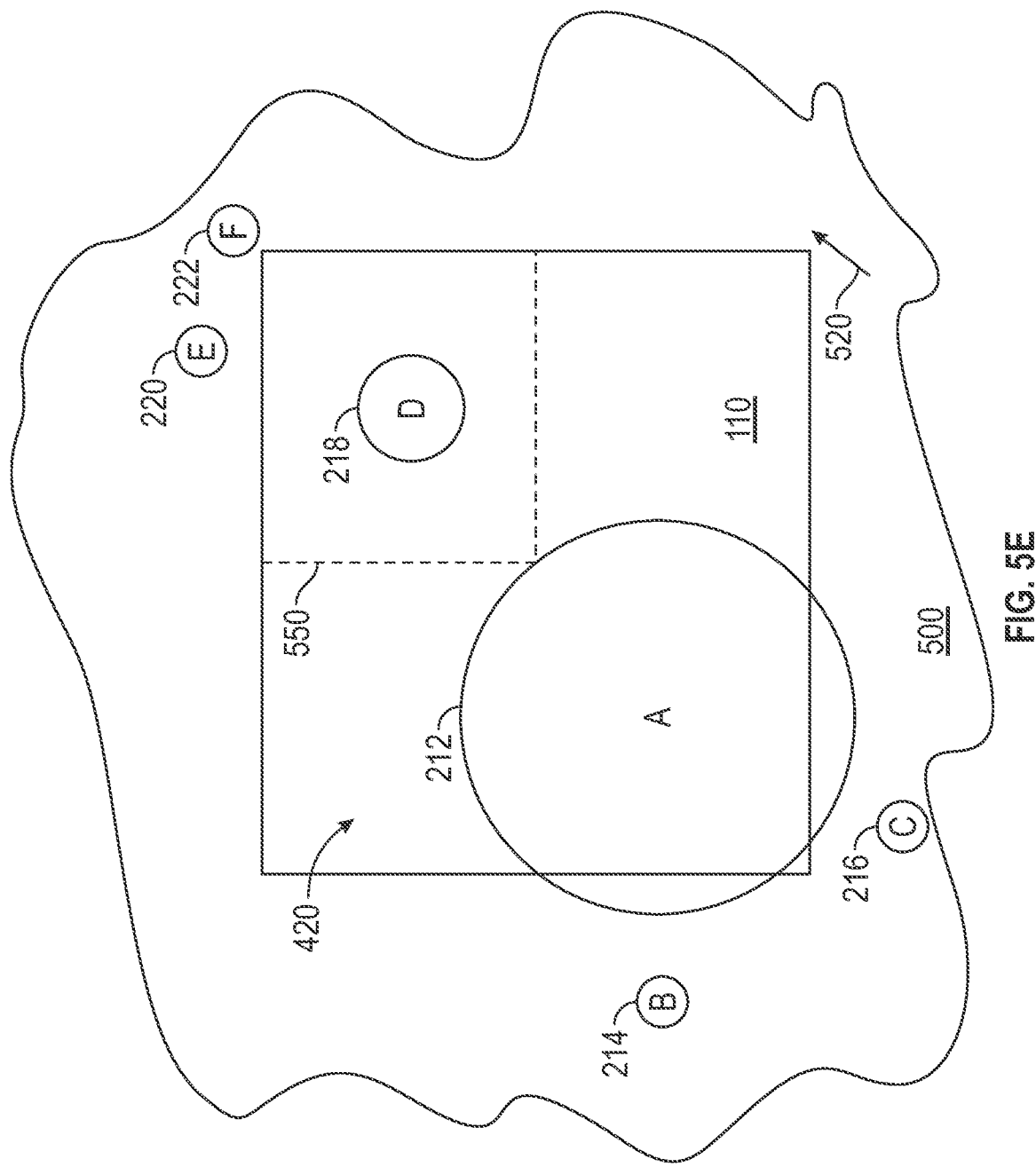

FIG. 5E is an illustrative drawing showing canvas locations of the display elements of the ZUI presentation on the canvas 500 relative to the display screen 110 during display of the paused target ZUI motion picture image 420. A ZUI motion picture transition from previous target ZUI image 418 to new target ZUI image 420 involves images showing panning in direction of arrow 520. The canvas 500 has moved relative to the screen display/viewing window 110 such that the fourth boundary display element 218 is located at about the center location 554 of the offset region 550. A portion of the first boundary display element 212 also is displayed on the screen 110 outside the offset region 550. The field of view within the display screen/viewing window 110 is zoomed in to the same distance as the zoom level in FIGS. 5C-5D, since the second, third and fourth boundary display elements 214, 216, 218 are the same size on the canvas 500, such that the display element content, text D, of the fourth boundary display element 218 is easily legible to a viewer.

FIG. 5F is an illustrative drawing showing canvas locations of the display elements of the ZUI presentation on the canvas 500 relative to the display screen 110 during display of the paused target ZUI motion picture image 422. A ZUI motion picture transition from previous target ZUI image 420 to new target ZUI image 422 involves images showing zooming in closer and panning in direction of arrow 522. The canvas 500 has moved relative to the screen display/viewing window 110 such that the fifth boundary display element 220 is located at about the center location 554 of the offset region 550. Portions of the first and fourth boundary display elements 212, 218 also are displayed on the screen 110 outside the offset region 550. Since the fifth boundary display element 220 is smaller in size than the second, third and fourth boundary display elements 214, 216, 218, the field of view within the display screen/viewing window 110 is zoomed in to a distance closer than the zoom levels in FIGS. 5B-5D, such that the display element content, text E, of the fifth boundary display element 220 is easily legible to a viewer.

Figure 5G:
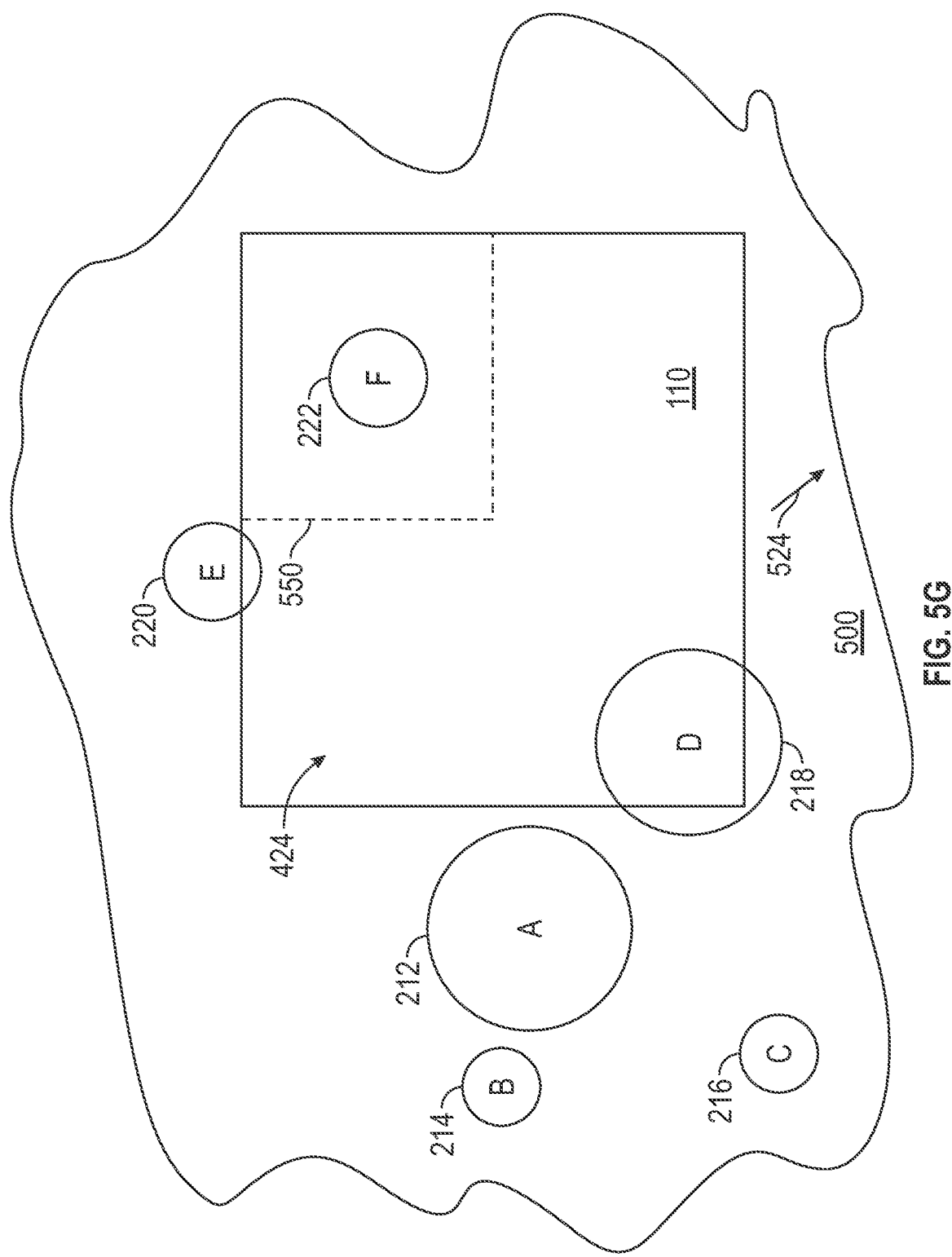

FIG. 5G is an illustrative drawing showing canvas locations of the display elements of the ZUI presentation on the canvas 500 relative to the display screen 110 during display of the paused target ZUI motion picture image 424. A ZUI motion picture transition from previous target ZUI image 422 to new target ZUI image 424 involves images showing panning in direction of arrow 524. The canvas 500 has moved relative to the screen display/viewing window 110 such that the sixth boundary display element 222 is located at about the center location 554 of the offset region 550. Portions of the fourth and fifth boundary display elements 218, 220 also are displayed on the screen 110 outside the offset region 550. Since the sixth boundary display element 222 is the same size as the fifth boundary display element 220, the field of view within the display screen/viewing window 110 is zoomed to the same level as FIG. 5F, such that the display element content, text F, of the sixth boundary display element 222 is easily legible to a viewer.

Figure 5H:
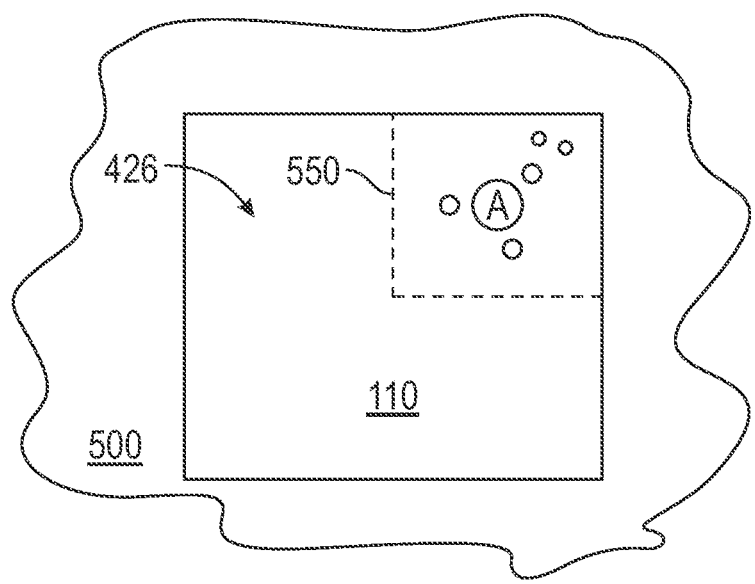

FIG. 5H is an illustrative drawing showing canvas locations of the display elements of the ZUI presentation on the canvas 500 relative to the display screen 110 during display of the paused ZUI motion picture image 426. The canvas 500 has moved to the same position relative to the screen display/viewing window 110 as in FIG. 5A. The example presentation, therefore, ends where it began, with the entire collection of display elements within the ZUI presentation displayed on the display screen 110 at or about a center location 554 of the offset region 550.

Physical Scene Example

Figure 6:
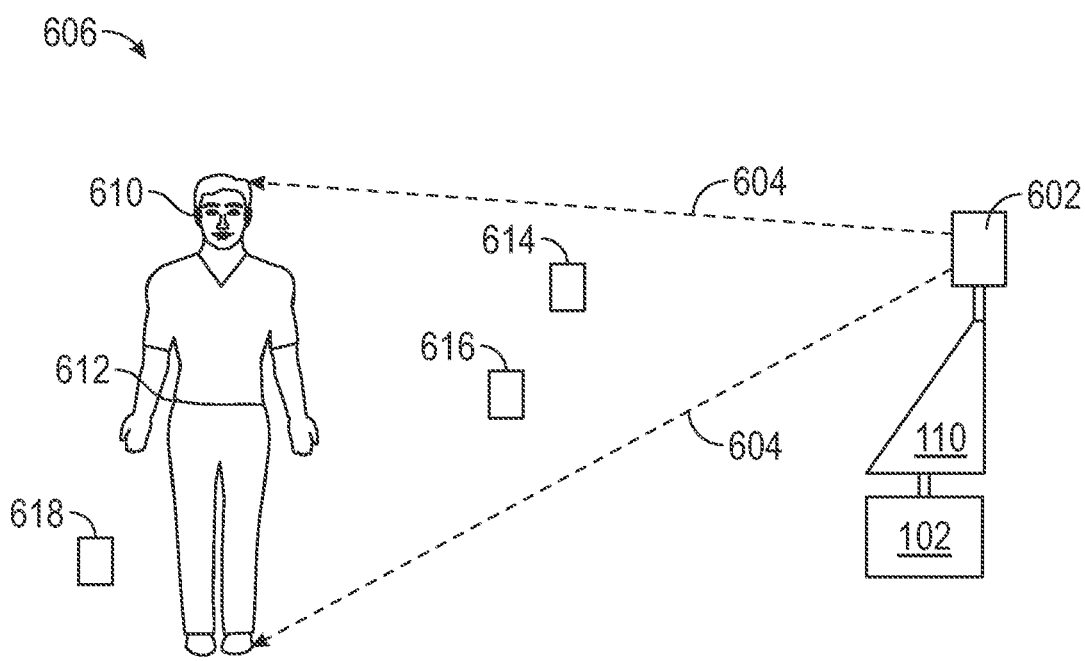
FIG. 6 is an illustrative drawing representing an arrangement of a motion picture camera to capture motion picture images of an example physical scene.

FIG. 6 is an illustrative drawing representing an arrangement of a motion picture camera 602 to capture motion picture image frames 604 of an example physical scene 606. The camera is coupled to the computer system 100 for display of the camera image frames 604 on the display screen 110. The example physical scene 606 includes a person's face 610, which is a first object in the scene, the person's body 612, which is a second object in the scene and may include a third, a fourth and a fifth object 614, 616, 618 that provide context for the scene. These other objects 614-618 may include furnishings such as tables and chairs if the scene is located inside a home or may include things of nature such as foliage and sky if the scene is located outside, for example.

Figure 7:
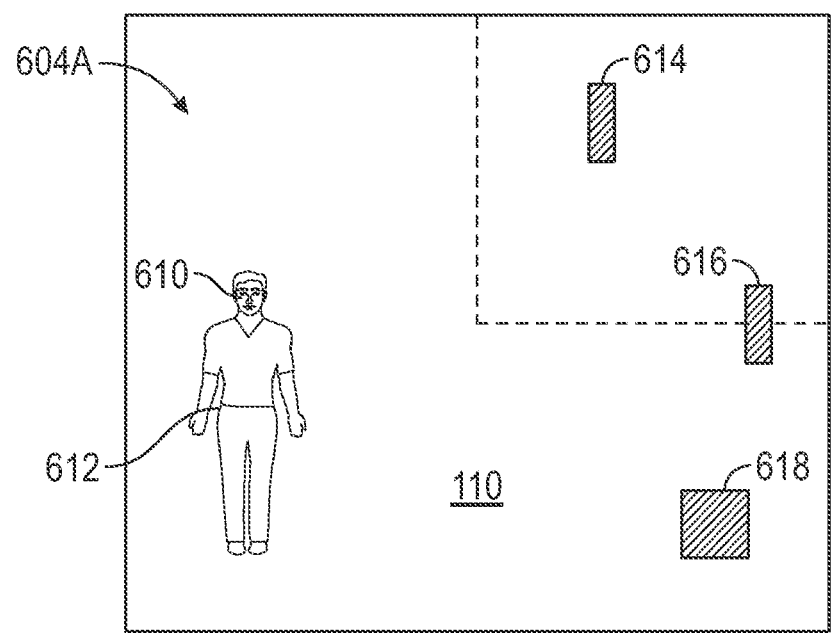
FIG. 7 is an illustrative drawing showing an example captured motion picture image frame displayed on the display screen.

FIG. 7 is an illustrative drawing showing an example individual captured motion picture image frame 604A displayed on the display screen 110. The person's face 610 and body 612 are disposed on the display screen 110 at a location outside of the offset region 550. A third object 614 is disposed within the offset region 550. The fourth object 616 is disposed partially within the offset region 550. The fifth object is disposed outside the offset region 550.

ZUI Presentation and Physical Scene Sharing a Display Screen

A ZUI motion picture sequence and a physical scene motion sequence are displayed together on the display screen 110. A person in the physical scene may make a presentation that that involves a hierarchy of topics. The presentation may transition between major topics or examples and minor topics or examples. The ZUI presentation acts as a visual aid in which the relative sizes of display elements on the display screen 110 provides visual cues indicating hierarchical relationships between the display elements. For example, a transition between a larger size display element and a smaller size display element may coincide with the presenter's transition between a major topic and a minor topic. The ZUI presentation includes a sequence of transitions from one display element with a pause following each transition. The presenter may discuss a topic corresponding to the currently transitioned to display element during the pause. Thus, the ZUI presentation and the physical scene motion picture presentation may be coordinated to display to a watching user a composited display in which relative sizes and placement of display elements in the ZUI presentation provide an indication of the relationship between topics addressed by the presenter in the physical scene presentation.

ZUI Command Index to Physical Scene Motion Picture Timeline

The computer system 100 contemporaneously receives physical scene motion picture image information from the camera 602 and receives manual ZUI commands from a user interface. For example, a ZUI control input may include a scrollable menu including thumb nail images of ZUI presentation's slides arranged along a side edge of a user's display screen. A user may select a thumb nail image to cause the presentation to transition from its current slide display to display of a slide corresponding to the selected thumb nail image. Alternatively, for example, a ZUI control input may include Forward and Reverse (or right and left) control buttons on a display screen or on a hardware console. A user selects one of the buttons to advance the ZUI presentation from a currently displayed slide to a slide located before or after it in the ZUI presentation. The CPU 102 may be configured to track and find the presenter's hands and/or fingers in the physical scene motion picture images. The presenter, may launch a ZUI transition command by holding her hands or fingers behind a ZUI display element for a given time, for example two seconds, to select the display element, causing a zooming-in ZUI transition to the selected display object. Alternatively, for example, the CPU 102 may be configured to automatically provide a sequence of ZUI commands with a pause in between each.

Figure 8:
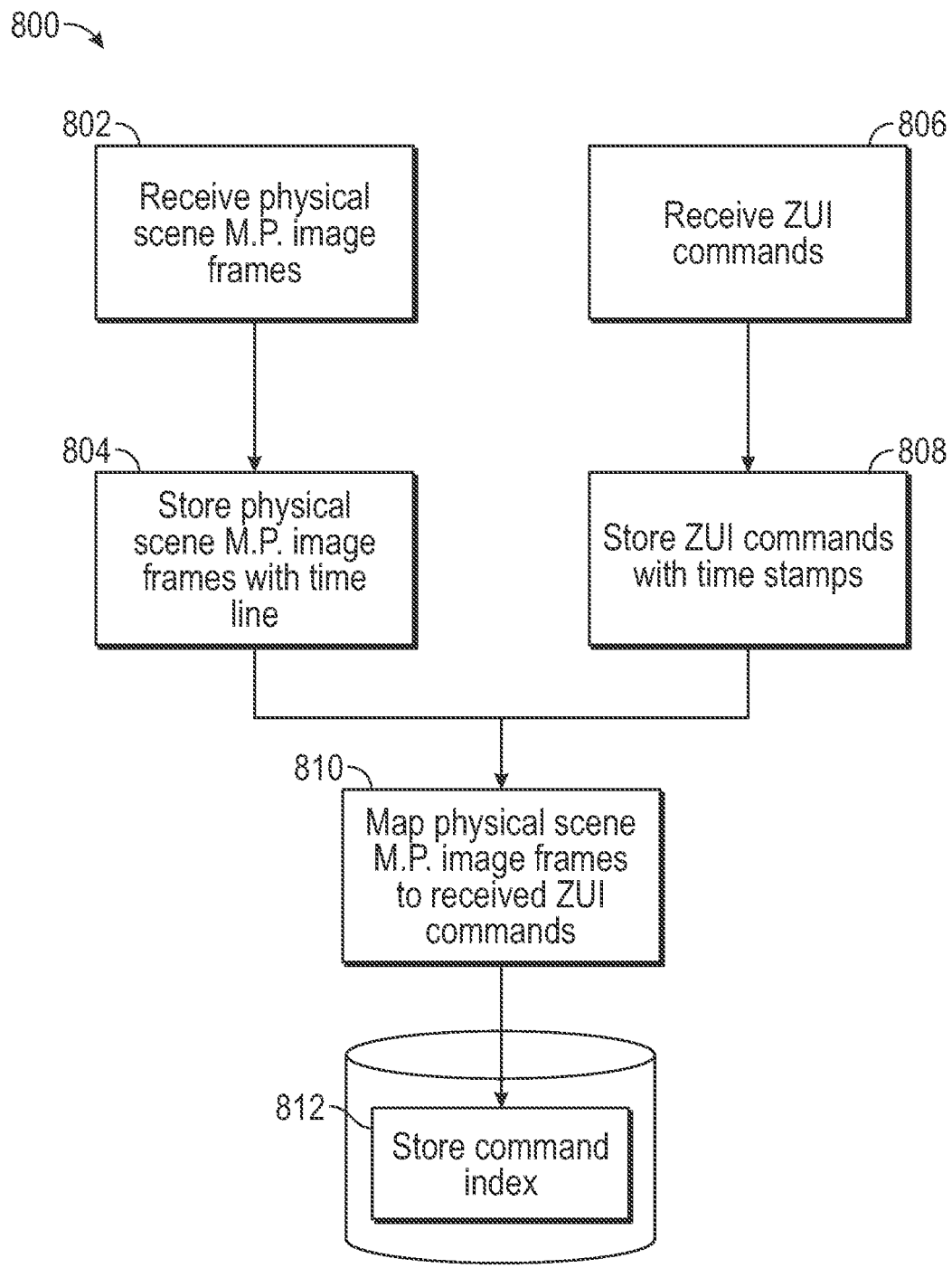
FIG. 8 is an illustrative flow diagram representing a process to produce a ZUI command index to a physical scene motion picture sequence.

FIG. 8 is an illustrative flow diagram representing a process 800 to produce a ZUI command index 904 to a physical scene motion picture sequence. The computer program instructions 124 include instructions to control creation of the ZUI command index 904. Block 802 represents the computer system 100 receiving physical scene motion picture frames at the data interface 119, captured by the camera. Block 804 represents the computer system 100 storing the physical scene motion picture frames, with a motion picture timeline, at the storage device 116. Block 806 represents the computer system 100 receiving at the data interface 119 or a user interface, ZUI commands to cause the display of ZUI presentation transitions and corresponding pauses. Block 808 represents the computer system storing the received ZUI commands, with timestamps, at the storage device 116. Block 810 represents the CPU 102 mapping ZUI commands to physical scene motion picture image information to produce a ZUI command index 904 shown in FIG. 9. The mapping involves matching timepoints of the physical scene timeline to time stamps associated with the ZUI commands. Block 812 stores the ZUI command index 904 in the at the storage device 116.

Figure 9:
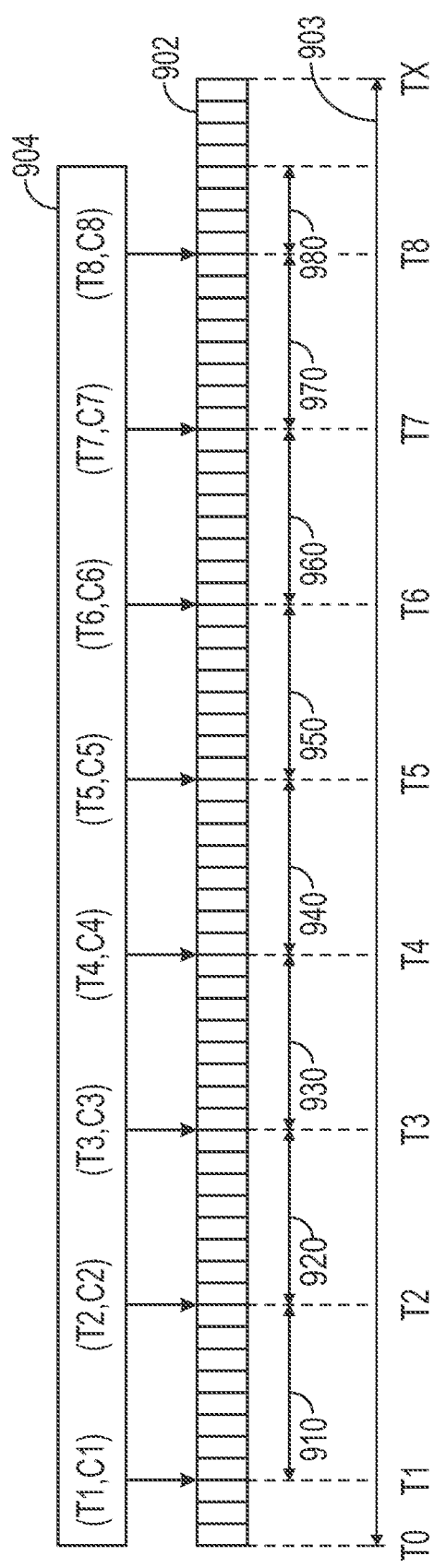
FIG. 9 is an illustrative drawing representing example physical scene motion picture image sequence and associated ZUI presentation command index.

FIG. 9 is an illustrative drawing representing example physical scene motion picture image sequence 902 and associated ZUI command index 904. The physical scene motion picture frame sequence 902 may be displayed on the display screen 110 together with the ZUI presentation motion picture images 402. The physical scene 606 may be recorded and displayed on the display screen 110 contemporaneously with playback of the pre-recorded ZUI presentation described with reference to FIGS. 3-5H, for example. The computer system 100 is configured to generate and store the ZUI command index 904 during the simultaneous recording of the physical scene and playback of the ZUI presentation. Subsequently, the recorded physical scene motion picture frame sequence 902 can be played back on the display screen 110 contemporaneously with playback of the pre-recorded ZUI presentation. The computer system 100 is configured to temporally align playback of the recorded physical scene and ZUI presentation motion picture images based upon the recorded ZUI command index 904.

A timeline 906, which extends from T0 at the beginning of the physical scene frame sequence 902 to TX at the end of the physical scene frame sequence 902, indexes the physical scene motion picture image sequence 902. In other words, the timeline 906 is associated with the physical scene motion picture image sequence 902, and individual image frames or segments of the image sequence 902 are associated with timepoints on the timeline 906. The ZUI command index 904 includes ZUI commands C1-C8 associated with timepoints T1-T8 on the timeline 906. More particularly, the ZUI presentation index 904 associates each ZUI command received by the computer system 100 during recording of the physical scene motion picture images with a timepoint associated with one or more physical scene images recorded at or about the timepoint when the command was received. Thus, the ZUI presentation index 904 acts to synchronize the physical scene motion picture image sequence 902 with a ZUI presentation motion picture images 402 that are displayed together on the display screen 110 at the time of recording of the physical scene 606.

Referring to FIG. 9, the physical scene motion picture image sequence 902 starts at time T0. Referring to FIG. 4 at time T1, a first user input command C1 is received initiating the first ZUI transition motion picture images 411, which precedes the first paused ZUI motion picture image 412. Referring to FIG. 8, in response to receipt of the first command C1, the first command C1 is added to the ZUI presentation index 904 to associate one or more physical scene image frames at or about time T1 of the timeline 906 with the first command C1 to produce a first command, timepoint pair (C1, T1). Similarly, at time T2, a second user input command C2 is received initiating the second ZUI transition motion picture images 413, which precedes the second paused ZUI motion picture image 414, and in response to the second command C2, the second command C2 is added to the ZUI presentation index 904 to associate one or more physical scene image frames at or about time T2 of the timeline 906 with the second command C2 to produce a second command, timepoint pair (C2, T2). The computer system 100 produces within the ZUI presentation index 904, third through eighth command, timepoint pairs (C3, T3), . . . (C8, T8) as shown.

ZUI display elements, not the ZUI canvas 500 itself, are displayed on the display screen 110. As a ZUI presentation is displayed in concert with a motion picture images of a physical scene, ZUI display elements may temporarily overlap portions of the physical scene as they move past it during panning and zooming. Prioritization rules are used to determine whether to display ZUI display elements or the physical scene at display screen locations where they overlap. Display of ZUI display elements may be prioritized over display of the physical scene images in most display screen regions except for priority scene regions of the physical scene. Rules may be invoked during an image compositing process to selectively fade out, remove, or make transparent, ZUI display elements to not obscure priority scene regions. Moreover, even if slides or display elements temporarily obscure a priority scene region such as a presenter's face, it may be desirable for that obscuring to be short and transitory in duration. For example, during a transition in a ZUI presentation, a display element following a path causing it to traverse across a presenter's face compositing rules may be invoked to temporarily faded out the image of the display element to make it transparent during its traversal across the face image to not obscure it. Once the traversal of the face image is complete and the display element has moved to a location on the display screen where it does not overlap with the face image, for example, compositing rules may be invoked to make the display element visible on the display screen.

Determining Priority Scene Region and Offset Region

Figure 10:
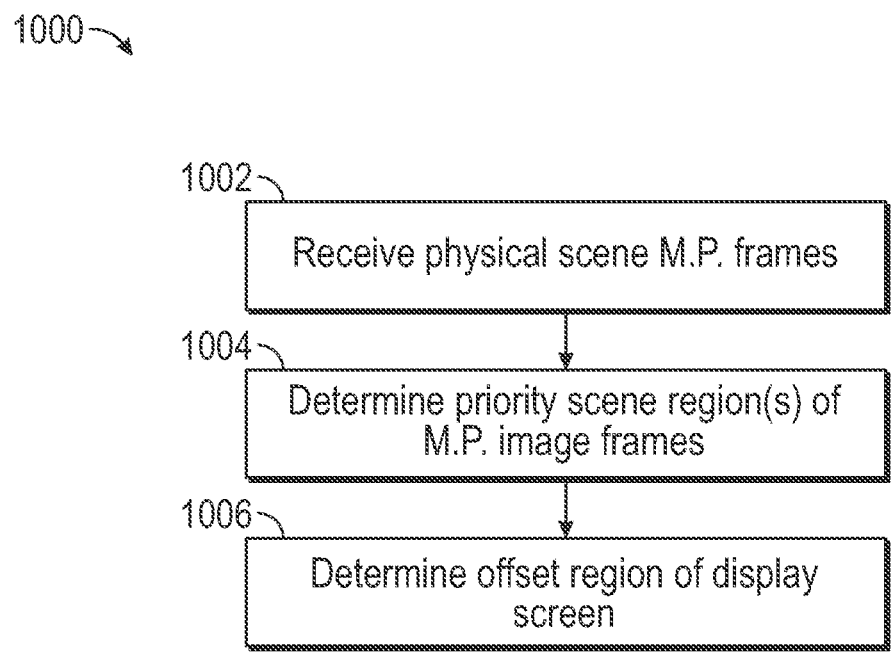
FIG. 10 is an illustrative flow diagram representing a process to determine prioritization and offset location of ZUI display elements.

FIG. 10 is an illustrative flow diagram representing a process 1000 to determine prioritization and target offset location of ZUI display elements. The computer program instructions 124 include instructions to instruct the computer system 100 to control scene prioritization and ZUI offset. Block 1002 represents the computer system 100 receiving a sequence of physical scene motion picture frames. Block 1004 represents the computer system 100 determining a display screen location of a priority region of the received physical scene motion picture frames. The priority scene regions may be determined based upon an image recognition process, which may involve pattern recognition such as facial and/or hand recognition, for example. Alternatively, a priority scene region may be a predetermined region such as the left or right side of the display screen 110, for example. Block 1006 represents the computer system 100 determining location of the offset region 550 on the display screen 110 where target display elements will be displayed during ZUI pauses. The offset region 550 may be a predetermined region of the display screen 110 such as an upper right corner of the display screen, for example. Alternatively, the offset region may be determined based upon a determined display screen location of a priority scene region. Specifically, a location on the display screen 110 of an offset region in which a target display element is displayed during a ZUI pause, may be selected to be spaced apart from a determined display screen location of a priority scene region so that the priority scene region and a display element within the offset region do not overlap or to at least minimally overlap.

Panning and/or Zooming to an Offset Screen Location

Figure 11:
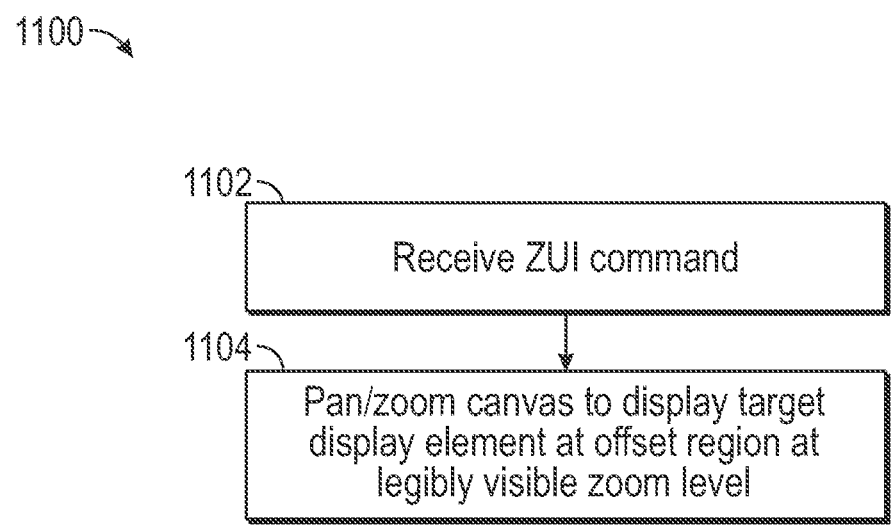
FIG. 11 is an illustrative flow diagram representing a process to pan and/or zoom to an offset location in response to a ZUI command.

FIG. 11 is an illustrative flow diagram representing a process 1100 to pan and/or zoom to an offset location in response to a ZUI command. The computer program instructions 124 include ZUI instructions to construct the computer system 100 to control pan/zoom to an offset location. Block 1102 represents the computer system 100 receiving at the data interface 119 or a user interface, a ZUI command to pan and/or zoom from a current display element to a target display element. Block 1104 represents the computer system 100 causing panning and/or zooming of the canvas 500 to display the target display element within an offset region that is offset far enough from a priority scene location to not overlap it when the target display element is paused while zoomed to a legibly visible zoom level.

Compositing ZUI Motion Picture Images and Physical Scene Motion Picture Images

Figure 12:
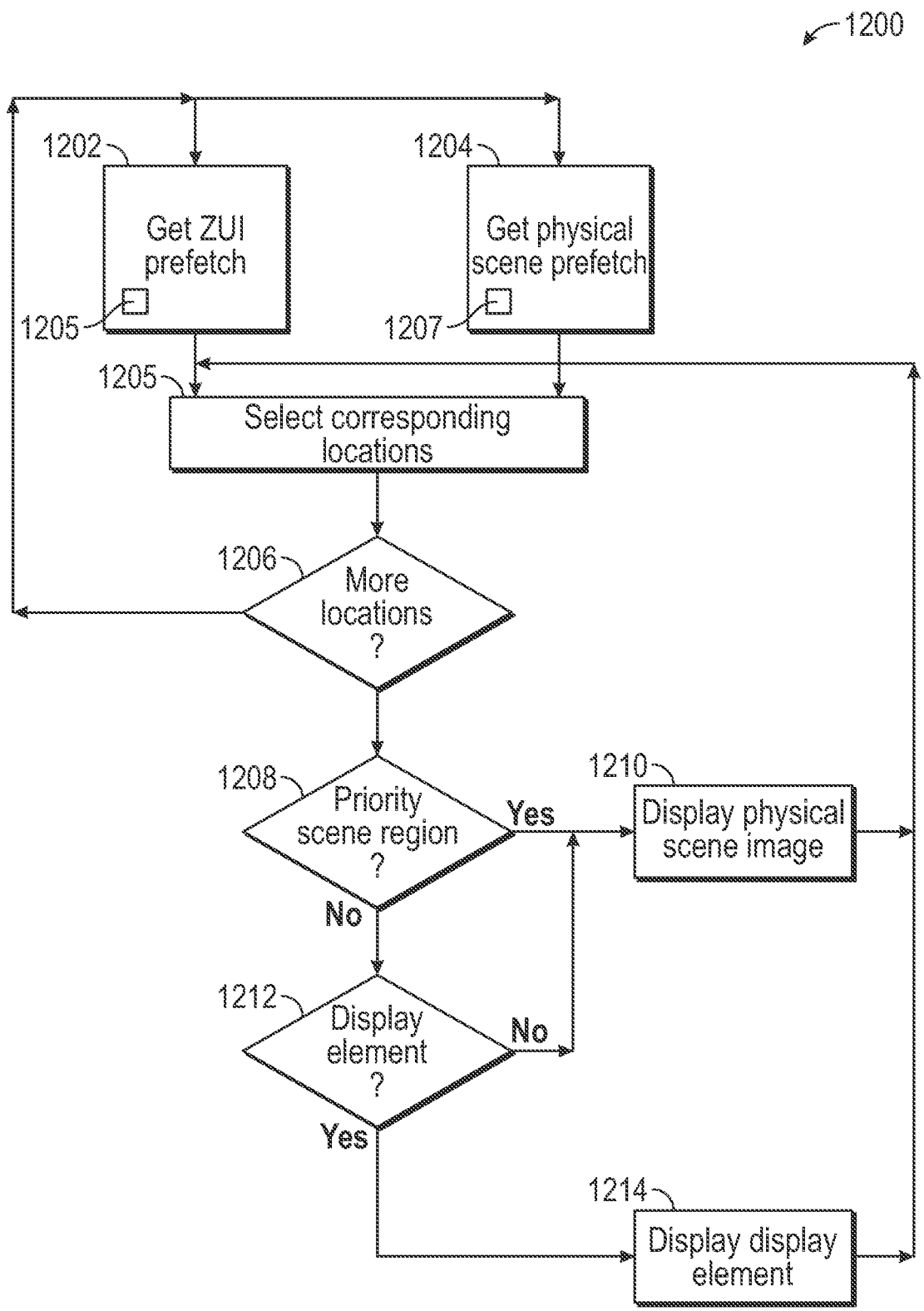
FIG. 12 is an illustrative flow diagram representing a process to composite physical scene motion picture frames and ZUI motion picture frames.

FIG. 12 is an illustrative flow diagram representing a process 1200 to composite physical scene motion picture frames and ZUI motion picture frames. The computer program instructions 124 include compositing instructions to instruct the computer system 100 to composite physical scene motion picture frames and ZUI motion picture frames.

At block 1202 the CPU 102 gets a next physical scene motion picture sequence frame in a first prefetch frame buffer portion 1205 of the storage device 116. The physical scene motion picture frames are received at the data interface 119 from the camera 602 during recording of the scene and are called up from the storage device 116 during physical scene playback. At block 1204 the CPU 102 gets a next ZUI presentation motion picture sequence frame in a in a second prefetch frame buffer portion 1207 of the storage device 116. Block 1205 represents the CPU 102 selecting corresponding display screen locations of the first and second prefetch frame buffers 1205, 1207 such as corresponding screen display pixel locations. Decision block 1206 represents determining whether there are more locations of the selected frame to evaluate. If no, then control flows back to blocks 120 and 1204 and a next physical scene motion picture sequence frame is gotten in the first prefetch frame buffer 1205 and a next ZUI presentation motion picture sequence frame is gotten in the second prefetch frame buffer portion 1207. If no, then in decision block 1208, the CPU 102 determines whether the first prefetch buffer 1205 contains image information representing a prioritized scene region. If yes, then at block 1210, the CPU 102 uses display information, such as a pixel value, at the selected location within the first prefetch buffer 1205 to produce a portion of the image on the display screen at a corresponding location on the display screen 110. If no, then at decision block 1212, the CPU determines whether the second prefetch buffer 1207 contains image information representing a display element. If no, then control flows to block 1210, and the CPU 102 uses display information at the selected location within the first prefetch buffer 1205 to produce a portion of the image on the display screen at a corresponding location on the display screen 110. If yes, then the CPU 102 uses display information, such as a pixel value, at the selected location within the second prefetch buffer 1205 to produce a portion of the image on the display screen at a corresponding location on the display screen 110. Following block 1210 or 1214, whichever is invoked during the cycle, control flows back to block 1206, which selects a next corresponding display screen locations of the first and second prefetch frame buffers 1205, 1207.

Composited ZUI Presentation Physical Scene Examples

Figure 13A:
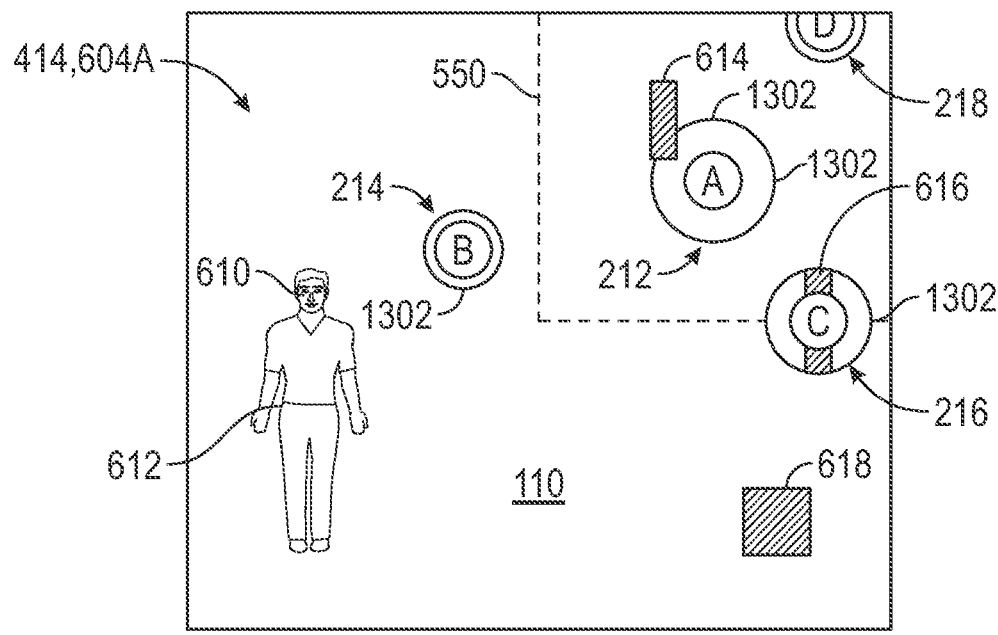
FIGS. 13A-13C are illustrative drawings showing example compositing of ZUI presentation frames and physical scene frames based upon prioritization and offset rules.
Figure 13B:
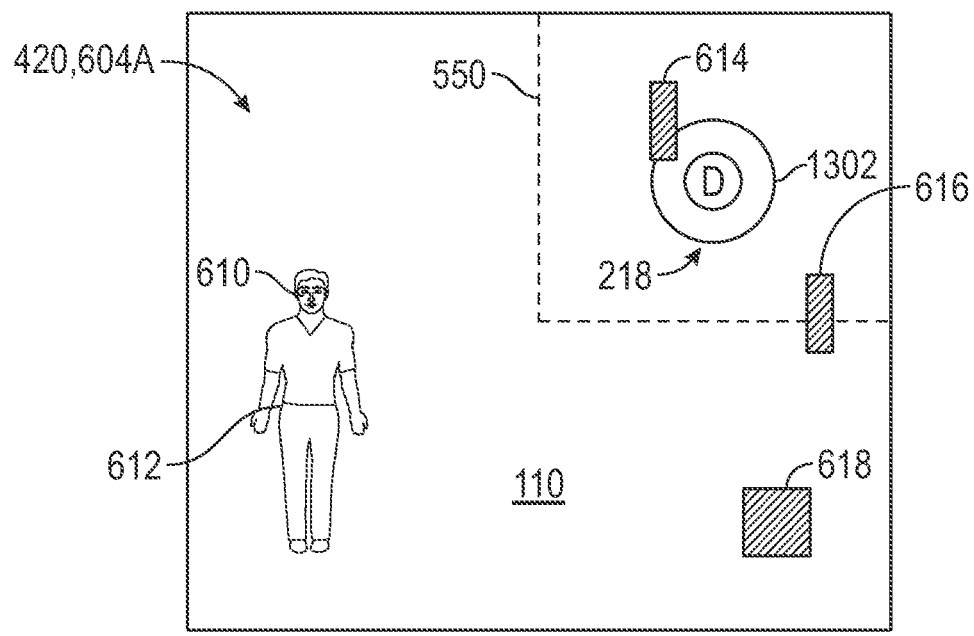
Figure 13C:
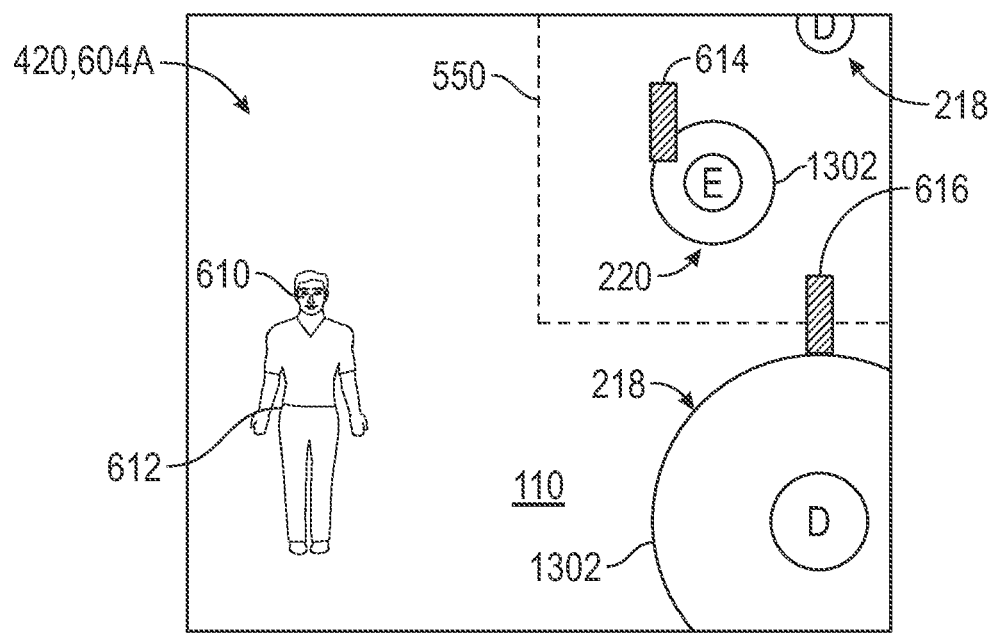

FIGS. 13A-13C are illustrative drawings showing example compositing of ZUI presentation frames and physical scene frames based upon prioritization and offset rules. FIG. 13A is an illustrative drawing representing compositing of the second paused ZUI motion picture image 414 of FIG. 5B and the individual captured motion picture image frame 604A of FIG. 7. The boundary display elements 212, 214, 216, 218 are transparent except for their outer perimeters 1302 and their text display element regions. A portion of the third object 614 is shown visible within the perimeter 1302 of the first boundary display element 212. A portion of the fourth object 616 is shown visible within the perimeter 1302 of the third boundary display element 216. However, the text C of the third boundary display element 216 overlays and obscures another portion of the fourth object 616 since, in this example, the fourth object 616 is not a prioritized as a priority scene region.

FIG. 13B is an illustrative drawing representing compositing of the fifth paused ZUI motion picture image 420 of FIG. 5E and the individual captured motion picture image frame 604A of FIG. 7. The boundary display elements 212, 214, 216, 218 are transparent except for their outer perimeters 1302 and their text display element regions. The first boundary display object is removed, since in this example, the face 610 and body objects 612 are prioritized as a priority scene region.

FIG. 13C is an illustrative drawing representing compositing of the sixth paused ZUI motion picture image 422 of FIG. 5F and the individual captured motion picture image frame 604A of FIG. 7. The text region D of the fourth boundary display element overlays and obscures the fifth object 618, since in this example, the fourth object 618 is not a prioritized as a priority scene region.

Figure 14:
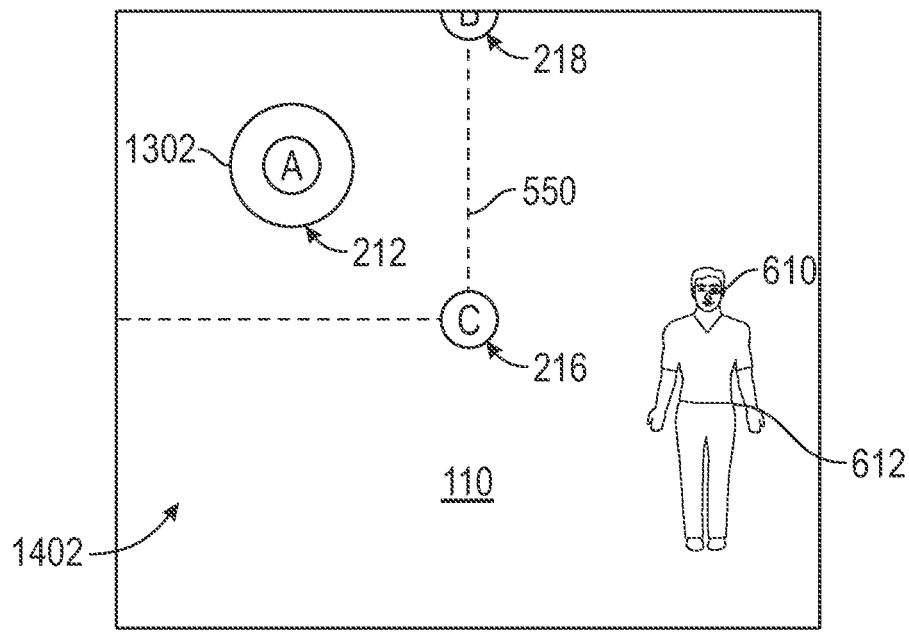
FIG. 14 is an illustrative drawing representing composite image with a changed location of the offset region on the display screen in response to a changed location of prioritized scene region the display screen.

FIG. 14 is an illustrative drawing representing composite image 1402 with a changed location of the offset region 550 on the display screen 110 in response to a changed location of the presenter image 610, 612 on the display screen 110. The scene prioritization and ZUI offset process 1000 of FIG. 10 causes the change in location of the offset region 550 in response to the change in the prioritized scene location, which may be a location of the presenter's face 610, for example. The boundary display element 212 is the current target within the display screen in the composite image 1402.

ZUI Command to Playback Composite Motion Picture Sequence

Figure 15:
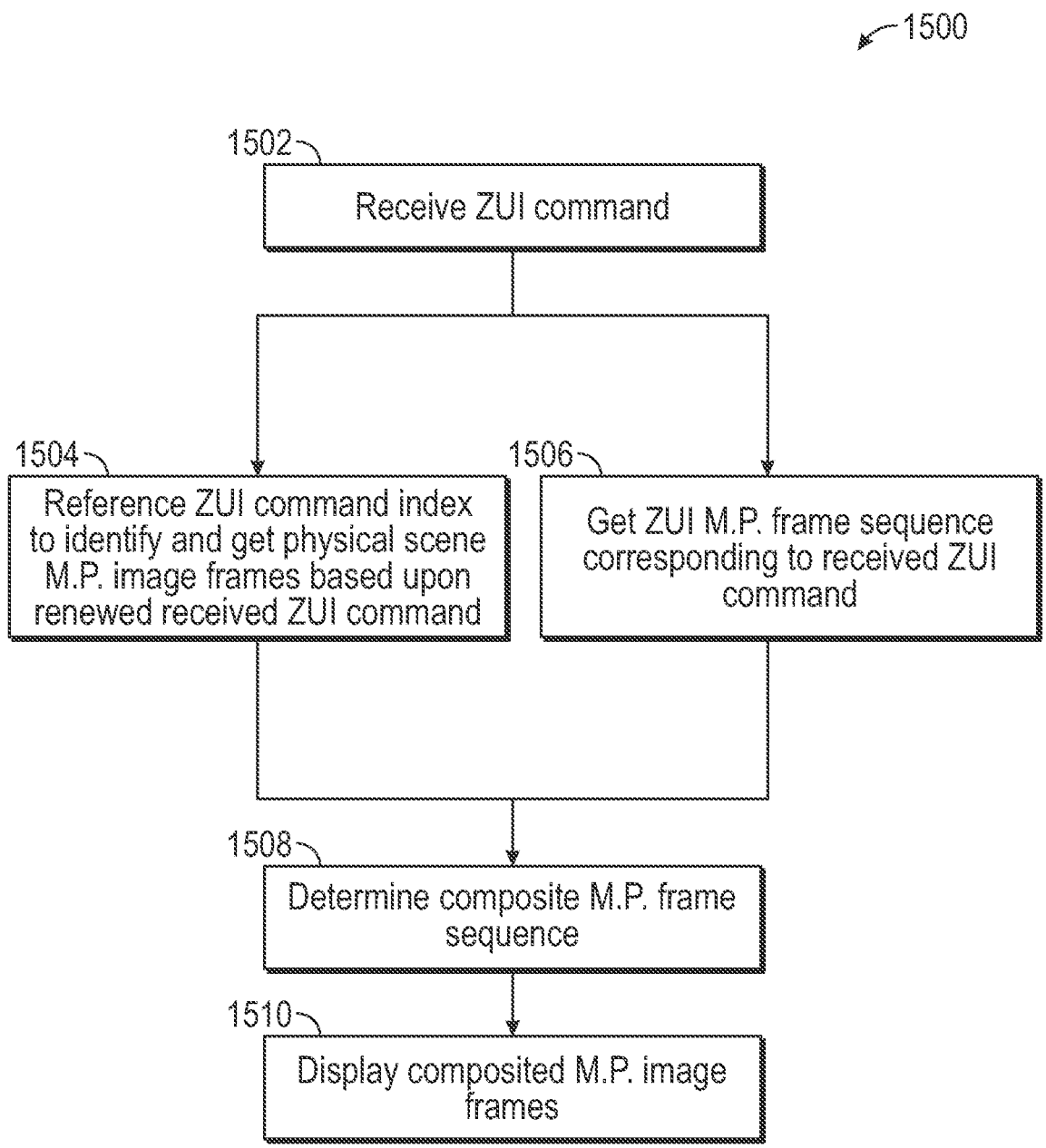
FIG. 15 is an illustrative flow diagram representing a process to replay a composite physical scene and ZUI presentation frame sequence in response to a ZUI command.

FIG. 15 is an illustrative flow diagram representing a process 1500 to replay a composite physical scene and ZUI presentation frame sequence in response to a ZUI command. The computer program instructions 124 include instructions to instruct the computer system 100 to control replay a physical scene segment in concert with a ZUI transition in response to a ZUI command. Block 1502 represents computer system 100 receiving a ZUI command that corresponds to a ZUI transition. Block 1504 represents the CPU 102 referencing the stored ZUI command index 904 to identify and get a physical scene motion picture frame sequence that corresponds to the received ZUI command. Block 1506 represents the CPU 102 getting ZUI presentation frames that correspond to the received ZUI command. Block 1508 represents compositing the gotten physical scene motion picture frames and the gotten ZUI presentation motion picture frames. The processes of FIGS. 10-12 may be used for the compositing. Block 1510 represents display of motion picture images on the display screen 110 using the composited motion picture frames.

Thus, a user can use a ZUI command to replay a segment of a motion picture recording of a physical scene based upon the ZUI command that was received at the time the physical scene motion picture segment was recorded. For example, assume that block 1502 receives ZUI command C2. Referring to FIG. 9, in response to ZUI command C2, block 1504 uses the ZUI command index 904 to identify and to get a physical scene motion picture sequence 920. Referring to the motion picture segments of FIG. 4, in response to ZUI command C2, block 1506 gets a motion picture sequence 413, 414. Block 1408 composites the gotten frames. Block 1510 displays composited frames 414, 604A shown in FIG. 13A.

In the preceding description, numerous details are set forth for the purpose of explanation. However, one of ordinary skill in the art will realize that the invention might be practiced without the use of these specific details. In other instances, well-known processes are shown in block diagram form in order not to obscure the description of the invention with unnecessary detail. Identical reference numerals may be used to represent different views of the same or similar item in different drawings. Thus, the foregoing description and drawings of embodiments in accordance with the present invention are merely illustrative of the principles of the invention. Therefore, it will be understood that various modifications can be made to the embodiments by those skilled in the art without departing from the spirit and scope of the invention, which is defined in the appended claims.

The invention claimed is:

1. A method of compositing a zooming user interface (ZUI) scene and a physical scene on a screen display, comprising:
displaying on a display screen, within both a priority region of the display screen and an offset region of the display screen, ZUI motion picture images that show a ZUI presentation that includes a plurality of target display elements on a transparent canvas, that includes a sequence of transitions of the target display elements in which during each transition at least one of the target display elements pans to a location in the offset region of the display screen, that includes zooming during at least one of the transitions, and that includes pausing of panning and zooming after each transition;
while displaying on the display screen the ZUI motion picture images that show the ZUI presentation that includes the sequence of transitions of the target display elements, displaying on the display screen, within both the priority region of the display screen and the offset region of the display screen, motion picture images that show a physical scene;
prioritizing within the offset region of the display screen, display of a portion of an image of a target display element within the ZUI presentation at a location within a portion of the offset region, over display of a portion of an image of a physical object within the physical scene motion picture, at a location within the offset region that overlaps the location of the portion of the image of the target display element within the offset region; and
prioritizing within the priority region of the display screen, display of a portion of an image of a physical object within the physical scene motion picture at a location within a portion of the priority region, over display of a portion of an image of a target display element that overlaps the location of the portion of the image of the physical object within the priority region.

2. The method of claim 1,
wherein the ZUI motion picture images show at least one display element within the ZUI presentation moving between a location within the offset region and the location within the priority region;
wherein prioritizing within the offset region, includes prioritizing display of at least a portion of an image of a target display element located within the offset region over display of at least a portion of an image of a physical object located within a portion of the physical scene located within the offset region; and
wherein prioritizing within the priority region, includes prioritizing display of at least a portion of an image of a physical object within a portion of the physical scene located within the priority region over display of at least a portion of an image of a target display element located within the priority region.

3. The method of claim 2,
wherein prioritizing at a location within the priority region, includes prioritizing display of an image of at least a portion of an image of a target display element over display of an image of a portion of the physical object within the portion of the physical scene while the image of the target display element is in transition within the priority region, to or from the location in the offset region of the display screen.

4. The method of claim 2,
wherein prioritizing at a location within the priority region, includes prioritizing display of an image of a portion of a physical object within a portion of the physical scene displayed within the priority region over display of a portion of a target display element displayed within the priority region, during the pausing of panning and zooming after each transitions.

5. The method of claim 2,
wherein the physical scene motion picture shows a first object;
wherein prioritizing within the offset region includes prioritizing display of a portion of the ZUI motion picture that includes a target display element over display of the first object within the offset region; and
wherein prioritizing within the priority region includes prioritizing display of the first object within the priority region over display of a portion of the ZUI motion picture that includes a target display element, within the priority region, while the ZUI is at a pause between transitions.

6. The method of claim 5,
wherein prioritizing within the priority region includes prioritizing display of a portion of the ZUI motion picture that includes a target display element, within the priority region, over display of the first object, within the priority region, while the at least one display element is in transition within the priority region.

7. The method of claim 2,
wherein the physical scene motion picture shows a first object and a second object;
wherein prioritizing within the priority region includes prioritizing, display of the first object over display of a portion of the ZUI motion picture that includes a target display element;
wherein prioritizing within the priority region includes prioritizing, display of a portion of the ZUI motion picture that includes a target display element over display of the second object.

8. The method of claim 1,
wherein displaying the sequence of target display elements at the offset region of the display screen includes displaying the sequence of target display elements at a legibly visible zoom level.

9. The method of claim 1,
wherein prioritizing at a location within the offset region includes prioritizing at a pixel location; and
wherein prioritizing at a location within the priority region includes prioritizing at a pixel location.

10. The method of claim 1,
wherein the offset region is offset from a center of the display screen.

11. The method of claim 1,
wherein the physical scene motion picture shows a first object; and
wherein the prioritized region includes a display screen location where the first object is displayed.

12. The method of claim 1,
wherein displaying on the display screen ZUI motion picture images; includes displaying ZUI motion picture images that show a portion of the ZUI presentation that is coextensive with the display screen.

13. The method of claim 1,
wherein displaying on a display screen, ZUI motion picture images includes displaying motion pictures of a target display element at a zoom level, during a panning and zooming transition, that is different from a zoom level at which the target display element is displayed during a pause, while the target display element is at the offset region.

14. The method of claim 1,
wherein displaying on a display screen, ZUI motion picture images includes displaying motion pictures of a first target display element zoomed-out, during a panning and zooming transition, and that is zoomed-in during a pause, while the first target display element is at the offset region; and
wherein displaying on a display screen, ZUI motion picture images includes displaying motion pictures of a second target display element zoomed-in, during a panning and zooming transition, and that is zoomed-out during a pause, while the second target display element is at the offset region.

15. A method of compositing a zooming user interface (ZUI) scene and a physical scene on a screen display, comprising:
displaying on a display screen ZUI motion picture images that show panning and zooming transitions within a ZUI presentation between a sequence of pauses at a sequence of target display elements within the ZUI presentation;
displaying on the display screen physical scene motion picture images;
wherein the act of displaying the ZUI motion picture images on the display screen includes showing the sequence pauses at a sequence of target display elements at an offset region of the display screen, offset from a priority region of the display screen;
further including:
prioritizing at a location within the offset region, display of a portion of the ZUI presentation over display of a portion of the physical scene; and
prioritizing at a location within the priority region, display of a portion of the physical scene motion picture over display of a portion of the ZUI presentation;
recording the physical scene motion picture images;
receiving a sequence of user commands during the act of recording the physical scene motion picture images, to cause the act of displaying on the display screen, ZUI motion picture images that show panning and zooming transitions within a ZUI presentation between a sequence of pauses at a sequence of target display elements within the ZUI presentation;
recording time stamp information corresponding to the physical scene motion picture images;
producing an indexing the received user commands to physical scene motion picture images based upon the time stamp information.

16. A method of compositing a zooming user interface (ZUI) scene and a physical scene on a screen display, comprising:
receiving a sequence of user commands during the displaying of the physical scene motion picture images, to cause display on the display screen, within both a priority region of the display screen and an offset region of the display screen, ZUI motion picture images that show a ZUI presentation that includes a plurality of target display elements on a transparent canvas, that includes a sequence of transitions of the target display elements in which during each transition at least one of the target display elements pans to a location in the offset region of the display screen, that includes zooming during at least one of the transitions, and that includes pausing of panning and zooming after each transition;
while displaying on the display screen the ZUI motion picture images that show the ZUI presentation that includes the sequence of transitions of the target display elements, displaying on the display screen, within both the priority region of the display screen and the offset region of the display screen, motion picture images that show a physical scene;
prioritizing within the offset region of the display screen, display of a portion of an image of a target display element within the ZUI presentation at a location within a portion of the offset region, over display of a portion of an image of a physical object within the physical scene motion picture, at a location within the offset region that overlaps the location of the portion of the image of the target display element within the offset region; and
prioritizing within the priority region of the display screen, display of a portion of an image of a physical object within the physical scene motion picture at a location within a portion of the priority region, over display of a portion of an image of a target display element that overlaps the location of the portion of the image of the physical object within the priority region.

17. The method of claim 16 further including:
indexing the received user commands to physical scene motion picture images.

18. The method of claim 17 further including:
selecting a portion of the physical scene motion picture and a portion of the ZUI motion picture images to display on the display screen based upon the indexed user commands.

19. An electronic presentation system comprising:
a computer system including:
at least one processor;
a non-transitory computer readable medium operably coupled to the at least one processor, the non-transitory computer readable medium comprising a plurality of instructions stored in association therewith that are accessible to, and executable by, the at least one processor;
a display screen;
wherein the plurality of instructions comprises:
instructions that, when executed, configure the at least one processor to cause the display screen to display ZUI motion picture images that show a ZUI presentation that includes a plurality of target display elements on a transparent canvas, that includes a sequence of transitions of the target display elements in which during each transition at least one of the target display elements pans to a location in the offset region of the display screen, that includes zooming during at least one of the transitions, and that includes pausing of panning and zooming after each transition, wherein the sequence of pauses at the sequence of target display elements are displayed at an offset region of the display screen, offset from a priority region of the display screen;
instructions that, when executed, configure the at least one processor to cause the display screen, while displaying on the display screen the ZUI motion picture images that show the ZUI presentation that includes the sequence of transitions of the target display elements, to display, within both a priority region of the display screen and an offset region of the display screen, motion picture images that show a physical scene;

instructions that, when executed, configure the at least one processor to prioritize at a location within the offset region of the display screen, display of a portion of an image of a target display element within the ZUI presentation at a location within a portion of the offset region, over display of a portion of an image of a physical object within the physical scene motion picture, at a location within the offset region that overlaps the location of the portion of the image of the target display element within the offset region; and instructions that, when executed, configure the at least one processor to prioritize at a location within the priority region of the display screen, display of a portion of an image of a physical object within the physical scene motion picture at a location within a portion of the priority region, over display of a portion of an image of a target display element that overlaps the location of the portion of the image of the physical object within the priority region.

20. The presentation system of claim 19, wherein the plurality of instructions comprises:

instructions that, when executed, configure the at least one processor to cause the display screen to display ZUI motion picture images that show at least one display element within the ZUI presentation moving between a location within the offset region and a location within the priority region;

instructions that, when executed, configure the at least one processor to prioritize within the offset region, display of at least a portion of an image of a target display element located within the offset region over display of at least a portion of an image of a physical object located within a portion of the physical scene located within the offset region;

instructions that, when executed, configure the at least one processor to prioritize within the priority region, display of at least a portion of an image of a physical object within a portion of the physical scene located within the priority region over display of at least a portion of an image of a target display element located within the priority region.

21. The presentation system of claim 20, wherein prioritizing at a location within the priority region, includes prioritizing display of an image of at least a portion of an image of a target display element over display of an image of a portion of the physical object within the portion of the physical scene while the image of the target display element is in transition within the priority region, to or from the location in the offset region of the display screen.

22. The presentation system of claim 20, wherein prioritizing at a location within the priority region, includes prioritizing display of an image of a portion of a physical object within a portion of the physical scene displayed within the priority region over display of a portion of a target display element displayed within the priority region, during the pausing of panning and zooming after each transitions.

23. The presentation system of claim 20, wherein the physical scene motion picture shows a first object;

wherein prioritizing within the offset region includes prioritizing display of a portion of the ZUI motion picture that includes a target display element over display of the first object within the offset region; and wherein prioritizing within the priority region includes prioritizing display of the first object within the priority region over display of a portion of the ZUI motion picture that includes a target display element, within the priority region, while the ZUI is at a pause between transitions.

24. The presentation system of claim 23, wherein prioritizing within the priority region includes prioritizing display of a portion of the ZUI motion picture that includes a target display element, within the priority region, over display of the first object, within the priority region, while the at least one display element is in transition within the priority region.

25. The presentation system of claim 20, wherein the physical scene motion picture shows a first object and a second object;

wherein prioritizing within the priority region includes prioritizing, display of the first object over display of a portion of the ZUI motion picture that includes a target display element;

wherein prioritizing within the priority region includes prioritizing, display of a portion of the ZUI motion picture that includes a target display element over display of the second object.

26. The presentation system of claim 20, wherein displaying the sequence of target display elements at the offset region of the display screen includes displaying the sequence of target display elements at a legibly visible zoom level.

27. The presentation system of claim 20, wherein prioritizing at a location within the offset region includes prioritizing at a pixel location; and wherein prioritizing at a location within the priority region includes prioritizing at a pixel location.

28. The presentation system of claim 20, wherein the offset region is offset from a center of the display screen.

29. The presentation system of claim 20, wherein the physical scene motion picture shows a first object; and wherein the prioritized region includes a display screen location where the first object is displayed.

30. The presentation system of claim 20, wherein displaying on the display screen ZUI motion picture images, includes displaying ZUI motion picture images that show a portion of the ZUI presentation that is coextensive with the display screen.

31. The presentation system of claim 20, wherein displaying on a display screen, ZUI motion picture images includes displaying motion pictures of a target display element at a zoom level, during a panning and zooming transition, that is different from a zoom level at which the target display element is displayed during a pause, while the target display element is at the offset region.

32. The presentation system of claim 20, wherein displaying on a display screen, ZUI motion picture images includes displaying motion pictures of a first target display element zoomed-out, during a panning and zooming transition, and that is zoomed-in during a pause, while the first target display element is at the offset region; and wherein displaying on a display screen, ZUI motion picture images includes displaying motion pictures of a second target display element zoomed-in, during a panning and zooming transition, and that is zoomed-out during a pause, while the second target display element is at the offset region.

33. An electronic presentation system comprising:
a computer system including:
at least one processor;
a non-transitory computer readable medium operably coupled to the at least one processor; the non-transitory computer readable medium comprising a plurality of instructions stored in association therewith that are accessible to, and executable by, the at least one processor;
a display screen;
wherein the plurality of instructions comprises:
instructions that, when executed, configure the at least one processor to cause the display screen to display ZUI motion picture images that show panning and zooming transitions within a ZUI presentation between a sequence of pauses at a sequence of target display elements within the ZUI presentation, wherein the sequence of pauses at the sequence of target display elements are displayed at an offset region of the display screen, offset from a priority region of the display screen;
instructions that, when executed, configure the at least one processor to cause the display screen to display physical scene motion picture images;
instructions that, when executed, configure the at least one processor to prioritize at a location within the offset region display of a portion of the ZUI presentation over display of a portion of the physical scene, and instructions that, when executed, configure the at least one processor to prioritize at a location within the priority region, display of a portion of the physical scene motion picture over display of a portion of the ZUI presentation;
instructions that, when executed, configure the at least one processor to record the physical scene motion picture images;
instructions that, when executed, configure the at least one processor to receive a sequence of user commands during the act of recording the physical scene motion picture images, to cause the act of displaying on the display screen, ZUI motion picture images that show panning and zooming transitions within a ZUI presentation between a sequence of pauses at a sequence of target display elements within the ZUI presentation;
instructions that, when executed, configure the at least one processor to record time stamp information corresponding to the physical scene motion picture images;
instructions that, when executed, configure the at least one processor to produce an indexing the received user commands to physical scene motion picture images based upon the time stamp information;
instructions that, when executed, configure the at least one processor to cause the display screen to display ZUI motion picture images that show at least one display element within the ZUI presentation moving between a location within the offset region and a location within the priority region;
instructions that, when executed, configure the at least one processor to prioritize at a location within the offset region, display of at least a portion of the at least one display element over display of a portion of the physical scene while the at least one display element is shown within the offset region;
instructions that, when executed, configure the at least one processor to prioritize at a location within the priority region, display of at least a portion of the physical scene over display of at least a portion of the at least one display element while the at least one display element is shown within the priority region.

34. A non-transitory computer readable medium comprising a plurality of instructions that, when executed by a processor, cause the processor to perform a method comprising:
displaying on a display screen, within both a priority region of the display screen and an offset region of the display screen, ZUI motion picture images that show a ZUI presentation that includes a plurality of target display elements on a transparent canvas, that includes a sequence of transitions of the target display elements in which during each transition at least one of the target display elements pans to a location in the offset region of the display screen, that includes zooming during at least one of the transitions, and that includes pausing of panning and zooming after each transition;
while displaying on a display screen the ZUI motion picture images that show the ZUI presentation that includes the sequence of transitions of the target display elements, displaying on the display screen, within both the priority region of the display screen and the offset region of the display screen, motion picture images that show a physical scene
prioritizing within the offset region of the display screen, display of a portion of an image of a target display element within the ZUI presentation at a location within a portion of the offset region, over display of a portion of an image of a physical object within the physical scene motion picture, at a location within the offset region that overlaps the location of the portion of the image of the target display element within the offset region; and
prioritizing within the priority region of the display screen, display of a portion of an image of a physical object within the physical scene motion picture at a location within a portion of the priority region, over display of a portion of an image of a target display element that overlaps the location of the portion of the image of the physical object within the priority region.

* * * * *

UNITED STATES PATENT AND TRADEMARK OFFICE
CERTIFICATE OF CORRECTION

PATENT NO. : 10,678,394 B2  
APPLICATION NO. : 15/961197  
DATED : June 9, 2020  
INVENTOR(S) : Somlai-Fischer et al.

Page 1 of 1

It is certified that error appears in the above-identified patent and that said Letters Patent is hereby corrected as shown below:

In the Claims

In Column 16, Line 67, in Claim 12, delete "images;" and insert --images,-- therefor In Column 17, Line 27, in Claim 15, delete "screen" and insert --Screen,-- therefor In Column 21, Line 11, in Claim 33, delete "processor;" and insert --processor,-- therefor In Column 21, Line 33, in Claim 33, delete "region" and insert --region,-- therefor In Column 21, Line 34, in Claim 33, delete "scene," and insert --scene;-- therefor Signed and Sealed this  
Eighth Day of September, 2020

Andrei Iancu  
*Director of the United States Patent and Trademark Office*